(12) United States Patent
Ruskykh

(10) Patent No.: US 11,229,104 B2
(45) Date of Patent: Jan. 18, 2022

(54) HANDY PORTABLE LIGHTING DEVICE FOR TAKING PHOTOS AND VIDEOS UNDERWATER

(71) Applicants: Oleksandr Oleksandrovych Siergeichikov, Kyiv (UA); Vasyl Oleksandrovych Ruskykh, Obukhiv Kievskaya obl (UA)

(72) Inventor: Vasyl Oleksandrovych Ruskykh, Obukhiv Kievskaya obl. (UA)

(73) Assignees: Oleksandr Oleksandrovych SIERGEICHIKOV, Kyiv (UA); Vasyl Oleksandrovych RUSKYKH, Obukhiv Kievskaya obi (UA)

( * ) Notice: Subject to any disclaimer, the term of this patent is extended or adjusted under 35 U.S.C. 154(b) by 0 days.

(21) Appl. No.: 17/270,991

(22) PCT Filed: Sep. 12, 2019

(86) PCT No.: PCT/UA2019/000113
§ 371 (c)(1),
(2) Date: Feb. 24, 2021

(87) PCT Pub. No.: WO2020/068026
PCT Pub. Date: Apr. 2, 2020

(65) Prior Publication Data
US 2021/0219404 A1    Jul. 15, 2021

(30) Foreign Application Priority Data
Sep. 25, 2018   (UA) ............................... a 2018 09631

(51) Int. Cl.
*H05B 47/11*       (2020.01)
*H05B 45/12*       (2020.01)
(Continued)

(52) U.S. Cl.
CPC ............... *H05B 47/11* (2020.01); *F21L 4/02* (2013.01); *F21V 31/00* (2013.01); *G03B 15/02* (2013.01); *H05B 45/12* (2020.01)

(58) Field of Classification Search
CPC ..... B63C 11/02; F21L 4/00; F21L 4/02; F21L 4/027; F21V 23/005; F21V 23/0414;
(Continued)

(56) References Cited

U.S. PATENT DOCUMENTS 7,740,371 B1 *  6/2010  Lebens ................ H04N 5/2252
                                                            362/205
9,746,170 B1 *  8/2017  Armer ................... F21V 29/503
(Continued)

FOREIGN PATENT DOCUMENTS

WO   WO-2016110484 A1 *  7/2016 ............. F21L 4/022

*Primary Examiner* — Renan Luque
(74) *Attorney, Agent, or Firm* — Nadya Reingand; Yan Hankin

(57) ABSTRACT

The inventive concept relates to illumination equipment for underwater photography and/or videography. The operating structure of the inventive concept achieves such an illumination of the environment, items, and living beings under water that affords optimum color at optimum distances for perception by an average person. The illumination device comprises a plurality of light emitters, which are configured to illuminate the environmental area of the illumination equipment. The illumination equipment includes at least one device for spectrum measurement that is configured to acquire information about the optical spectrum of the ambient illumination within the environmental area, and control means for modifying the emissions of the light emitters based on the acquired information about the optical spectrum. The light emitters may be at least one or more of red, blue, green, and white light emitters. The light spectrum is
(Continued)

measured using an RGB-sensor formed by at least three illuminance measurement sensors.

6 Claims, 14 Drawing Sheets

(51) Int. Cl.
*F21L 4/02* (2006.01)
*F21V 31/00* (2006.01)
*G03B 15/02* (2021.01)

(58) Field of Classification Search
CPC .... F21V 29/503; F21V 29/507; F21V 29/508; F21V 29/56; F21V 29/58; F21V 29/83; F21V 29/89; F21V 31/00; F21V 31/005; F21V 5/006; F21V 5/007; F21V 5/048; F21V 9/083; F21V 9/45; F21Y 2105/10; F21Y 2105/18; F21Y 2115/10; F21Y 2115/30; G01J 3/02; G01J 3/0272; G01J 3/0278; G01J 3/0291; G01J 3/10; G01J 3/505; G01N 2201/0221; G01N 2201/062; G01N 2201/0627; G03B 11/00; G03B 15/02; G03B 15/03; G03B 2215/0517; G03B 2215/0567; G03B 2215/0592; Y10S 362/80; H05B 47/11; H05B 45/12

See application file for complete search history.

(56) References Cited

U.S. PATENT DOCUMENTS

| | | | |
|---|---|---|---|
| 2006/0257130 A1* | 11/2006 | Lee | G03B 15/03 396/106 |
| 2009/0014624 A1* | 1/2009 | Blees | F21L 4/00 250/201.4 |
| 2014/0340572 A1* | 11/2014 | Sato | G03B 15/05 348/370 |

* cited by examiner

Plot 2

Plot 3

HANDY PORTABLE LIGHTING DEVICE FOR TAKING PHOTOS AND VIDEOS UNDERWATER

FIELD OF THE INVENTION

The invention relates to illumination equipment intended to be used as an illumination device when performing either or both photography and videography including performing photography and videography underwater. In particular, the inventive concept is substantially a portable hand-held illumination device for underwater photography and videography that is performed underwater using a digital photo and video camera or other devices intended for photography and videography.

BACKGROUND

When performing photography and videography underwater from even relatively shallow depths, there is always a problem of achieving such photo and video fixation of images, which could store information about all colors of a visible light spectrum, which are essential for perception by an average person. That is, natural properties of an underwater environment do not enable photography and videography to be performed using the same proper fixation of photo and video frames as in outdoor conditions, and it occurs due to certain natural properties of the illumination that exists underwater at various depths. Traditional illumination devices, special lights, and other devices, configured for the underwater photography and videography are usually used during the underwater photography and videography.

Terms "a camera", "a photo and video camera", "a video and photo camera", which are used hereinafter, refer to any modern digital photo and/or video camera having a photomatrix. The specification also states an exemplary use of the claimed structure together with an analog film camera.

In the modern technologies of photography and videography, fixation of the image by a digital camera involves color separation of a colored image into several components (so called "color channels"), and this color separation may occur in various ways. A dichroic prism may be used for the color separation in multi-matrix digital cameras (i.e., cameras comprising several photomatrixes). In single-matrix digital cameras (i.e., cameras comprising one photomatrix), an array of color light filters (e.g., "Bayer filter") covering the photomatrix is usually used for the color separation; wherein "a red color channel" receives an image that has passed through an array of red light filters, "a green color channel" receives an image that has passed through an array of green light filters, and "a blue color channel" receives an image that has passed through an array of blue light filters, respectively.

The term "photomatrix", when it is used hereinafter, shall be considered as the one that refers to all photomatrixes present as being a single one unit object, if a quantity of photomatrixes in the digital camera is not clearly stated.

Water (the environment, wherein the claimed illumination device is planned to be used), as compared to air, absorbs light differently in different spectrum ranges. The Plot 1 (FIG. 6) depicts spectral characteristics for the light created by a bundle of parallel beams, having initially identical relative intensity levels of 100% in any region of the entire visible spectrum range that has passed:

deep down through 5 meters of water of a certain usual water body (indicated with a solid line "A" in the Plot 1 of FIG. 6);

deep down through 10 meters of water of the same water body (indicated with a dashed line "D" in the Plot 1 of FIG. 6).

In this case, the Plot 1 (FIG. 6) depicts a wavelength (from 350 to 700 nm) in the horizontal direction and "the relative emission intensity" (from 0% to 100%) in the vertical direction. For the depth of 0 meters, this plot would look like a straight line, wherein the relative emission intensity would equal to 100% for any wavelength of from 350 to 700 nm.

As it is seen from the Plot 1 (FIG. 6), when the depth is increased, the light flux is not only reduced, but also this reduction of the light flux occurs differently in different regions of the spectrum.

By conducting practical studies, the inventor has obtained mean integral values of the relative light intensity that initially has identical intensity levels in any region of the visible spectrum range that has passed through a layer of the above-mentioned water with a thickness of 5, 10, and 20 meters. Table 1 states these very average integral values of the relative light intensity for different portions from the visible spectrum range.

TABLE 1

| | | Average integral value of the relative light intensity, % | | | |
|---|---|---|---|---|---|
| Wavelength, nm | Corresponding color | Depth 5 meters | Depth 10 meters | Depth 20 meters | Depth 30 meters |
| 350 . . . 450 | Purple | 60.69 | 44.32 | 27.3 | 18.09 |
| 450 . . . 480 | Blue | 88.83 | 78.91 | 62.27 | 49.14 |
| 480 . . . 510 | blue-green | 88.99 | 79.19 | 62.71 | 49.66 |
| 510 . . . 550 | Green | 84.4 | 71.34 | 51.19 | 36.94 |
| 550 . . . 570 | yellow-green | 67.6 | 46.04 | 21.81 | 10.61 |
| 570 . . . 590 | Yellow | 43.41 | 19.38 | 4.16 | 0.973 |
| 590 . . . 630 | orange | 21.71 | 4.87 | 0.27 | 0.0173 |
| 630 . . . 700 | Red | 6.82 | 0.79 | 0.0143 | 0.000304 |

In fact, there are no precise boundaries for regions of the spectrum in which the emission of the monochromatic light with the corresponding wavelength could be perceived by human as a certain color. So, the commonly accepted values of the wavelengths for the borders between the colors were taken as an example. Boundaries for the entire visible light spectrum are rather conditional as well. It is commonly believed that the region of 380 . . . 400 nm is for the boundary of a short-wave portion of the visible spectrum, while the region of 760 . . . 780 nm is for the boundary of a long-wave portion. However, considering peculiarities of the water environment, namely the fact that components of the light with the wavelength of more than 700 nm are absorbed by the water so strongly that in as much as several meters, their emission intensity is about zero (that is depicted in the Plot 1, FIG. 6), 700 nm was set as an upper boundary for the visible spectrum range (and, thus, for the red color) in the Table 1. 350 nm was chosen for a lower boundary, because the photomatrix of a typical digital camera at the region of 350 . . . 400 nm is still sensitive, while the daylight that has passed through the water still has notable relative illuminance levels at this region (for certain water bodies).

As it is seen from the Table 1, if the depth of 5 meters (for the water of a certain typical water body being researched) is "reached" by the average of 88.83% of the light flux of blue color, this value for the orange color will be only 21.71%. And for the depth of 10 meters, these values are, respectively: 78.91% for the light flux of the blue light and 4.87% for the light flux of the orange light.

Therefore, if we calculate the ratio between the light fluxes for one color range at different depths of 5 meters and 10 meters, then for the blue light, when the depth is increased from 5 up to 10 meters, the light flux will diminish approximately by 1.13 times, while for the orange light—approximately by 4.46 times. If we calculate the ratio for the color fluxes of the blue and orange light for the depths of 10 and 20 meters, then for the blue light, the reduction of the light flux will take place approximately by 1.27 times, while for the orange color—approximately by 18 times now. The reduction of the light flux of the blue and orange light in case of increasing the depth from 10 meters up to 30 meters will be: for the blue light—approximately by 1.61 times, for the orange light—by more than 280 times.

That is, when the depth underwater is increased, changes of the spectrum of the natural daylight illumination (that naturally comes at the depth) will become more and more significant.

If during the underwater photography and/or videography no special actions and structures for additional illumination are used, then objects, which are captured on the digital photo and video camera underwater at this natural illumination will have unnatural color rendering (usually, predominantly with green or blue shading). And in case of insufficient capacity for information about color characteristics (such as coordinates within the corresponding color space) of each pixel of the image that is saved in the electronic form, it will become impossible to recover the natural color rendering at a step of post-processing of the fixed image and some colors will be irreversibly lost.

One of the known ways to solve this problem is to use a mechanism for adjustment of a white-balance which relies on the fact that a lens of the photo camera underwater (directly before start of shooting) is directed onto an object that has a white or a gray color, and the camera is commanded to "set a white-balance" by control means. Algorithms of this photo and video camera automatically calculate "correction coefficients" for the red, green, and blue channels (image components) such that this object (onto which the lens of the camera is preliminary directed) could "take" white or gray color on the initial photo or video, and thus, other objects of the shooting will take more natural color rendering.

There are other known devices and methods for correcting the color rendering. For example, colored light filters, which are put on the lens of the photo camera, are used for the correction of the color rendering during the underwater photography or videography.

Also, as one of methods of "controlling" losses of colors having a weak intensity during processing by "lossy compression" algorithms (such as in the known formats JPEG, MPEG-4 and the like) and digital recording of information about color characteristics of the image pixels having resolution that is smaller than the resolution of (one or more) an ADC (analog-to-digital converter) of the camera (that may be comprised within the photomatrix and may be connected to the photomatrix), image recording in the RAW-format is used, wherein the "lossy compression" algorithms are not used at all, and brightness of the image pixels in each color channel is stored in the digital form with the same resolution as the one of the ADC for the corresponding color channel.

All these above-mentioned mechanisms and methods operate at relatively small depths underwater where, even with consideration of the substantial absorption of the light by the water in certain portions of the spectrum, the natural illumination is insufficient for the photomatrix of the camera to "see" all colors of the visible spectrum range, which are essential for perception by an average person, though, in these cases the color rendering of the obtained image will differ from the images on land or at the water surface because significant differences of the light absorption degree within different regions of the same range that correspond to a certain color channel of the camera photomatrix. For example, if we take the red color channel of the camera photomatrix, it is the most sensitive to light from the range that is usually from 570 nm to 700 nm that corresponds to yellow, orange, and red colors. As it is seen from the Table 1, the illuminance levels will be significantly different for these three different colors of the single-color channel of the camera photomatrix, and according to the research (Plot 1 (FIG. 6), Table 1), when the depth is increased, this disproportion will only increase.

Starting from a certain depth, the natural daylight of a certain portion of the spectrum range, which the camera photomatrix is sensitive to, will be absorbed by the water so strongly that the illuminance level of the object in this portion of the spectrum will be below the sensitivity threshold of the camera photomatrix even at the highest values of ISO (light sensitivity of the camera photomatrix). In this case, without using an additional illumination source, it is physically impossible to obtain an image, wherein colors of this portion of the spectrum that was absorbed by the water in the strongest way could be present. In this situation, neither the mechanism of "white-balance" correction nor the use of colored light filters on the lens of the camera (which additionally reduce the illuminance level of the image within the frame), nor storing the image in the RAW-format, will help, since certain colors will be lost yet at the step of their fixation by the photomatrix of the digital camera.

In this case, the only one possible solution is to use an additional illumination source (or several sources) that must operate at a distance that is significantly closer to the object under shooting than a distance from the object to the water surface (which the natural light comes from). To achieve the mentioned purpose, the one usually uses various known light engineering devices for the photography and videography, underwater lights, which could operate both as stand-alone appliances (separately controlled by human) and as the ones that are associated with the photo and video equipment and under the automatic control thereof. However, in this case, another problem appears: the objects under shooting will be illuminated both by the existing illumination from the natural daylight source and by the artificial illumination source (e.g., from the underwater light). Therewith, while the illuminance from the natural illumination source will be almost unchanged for all objects located at the same depth, the illuminance from the artificial illumination source will be significantly reduced in the course of distancing of these shooting objects from this artificial illumination source. Therefore, the ratio of illuminance of each object both from the natural illumination and from the artificial illumination will vary drastically, thus, the spectral characteristic of such combined illumination will also vary drastically, depending on the distance between the object and the artificial illumination source. That is, if standard illumination appliances (e.g., underwater lights, special video and photo illumination), wherein the spectrum of the light emitted by them is stable, and this spectrum is not able to vary depending on the ambient illumination spectrum used during the underwater videography and photography, then, when illuminating the objects under shooting by such illumination devices together with the natural illumination, a significantly different spectral characteristic of the illuminance of the objects, which are located at a different distance from the illumination devices (thus, from the photo and video camera), will be obtained. In such cases, it will be impossible to recover the natural color rendering within all image regions, since when attempting, and because of the color correction, the following will occur:

either the closest objects will become redder, or the distant objects will take more green and blue shading (according to the data in the Table 1 and according to the plot 1, FIG. 6).

In case, if the object is illuminated with the light having spectrum that is identical to the ambient illumination spectrum (i.e. simply to repeat, replicate the ambient illumination spectrum), it will solve the problem of the significant difference of the illumination spectrum of the objects of the closer and distant view (objects, which are located more closely and more distantly), and, under the proviso of sufficient emission power within the illumination device, it will also solve the problem of the insufficient illuminance level from the natural illumination in those very area of the visible spectrum, wherein the sensitivity threshold of the camera photomatix is exceeded. However, another problem occurs in this case. Starting from a certain depth, the natural daylight in a certain color of the region of the visible spectrum range that corresponds to the one that is essential for perception by an average person will be absorbed by the water so strongly than the same light within other regions of the visible spectrum range that the ratio between the illuminance level within the least absorbed spectrum area and the illuminance level within the most absorbed spectrum area, with consideration of relative sensitivity levels of the camera photomatrix for these regions of the spectrum, will exceed a certain value that corresponds to the dynamic sensitivity range of the camera photomatrix.

If we take the value of the relative light intensity from the Table 1 for the depth of, e.g., 30 meters, then the ratio between the maximum value (49.66% for the spectrum region of 480 . . . 510 nm that corresponds to blue-green color) and the minimum value (0.000304% for the spectrum region of 630 . . . 700 nm that corresponds to the red color) will be approximately 163355. If the camera photomatrix has a dynamic range of, e.g., 14 degrees of optical exposure, i.e. the ratio between the level of the maximum bright pixel and the level of the minimum bright pixel is $2^{14}=16384$, then for the above-mentioned case, the digital camera "will not see" any object (or portion of the object) of the red color, even considering different sensitivity of the photomatrix within the above-mentioned regions of the spectrum, since values, which correspond to the dynamic range of the sensitivity of the camera photomatrix, and the ratio of the illuminance within the above-mentioned regions of the spectrum, differ by about 10 times not in favor of the camera photomatrix. If the depth is increased, such ratio will only increase.

Also, as it has been already described above, and, as it is seen from the Table 1 and the Plot 1 (FIG. 6), even at small depth underwater (e.g., at the depth of 5 meters), there is a situation when in a single-color channel of the camera, the illuminance level within different regions of the spectrum of the same spectrum range corresponding to a certain color channel of the camera will significantly differ. As a result, the color rendering at the depth underwater will not correspond to the one that it should be overland or at the water surface.

Thus, during the underwater photography and videography, there is completely no sense for the illumination device to precisely repeat (or to replicate) the spectrum of the existing ambient illumination.

Summarizing the examples of the known prior art, it is possible to conclude that during the underwater photography and/or videography it becomes necessary to have an illumination device having a structure that could enable photography and videography to embody and to implement such an operation mode, in which the emitted light could have:

such spectral characteristics, which change depending on the spectral characteristics of the ambient natural illumination underwater, as well as such spectral characteristics, which enable to achieve a maximum close color rendering for the objects, which are located at a different distance from the illumination device, as well as such spectral characteristics, which enable to obtain an image in the digital form, which stores all the information (in case of coding the image "without losses" or, if this information will not be lost during the image compression "with losses") about all the colors, which are essential for perception by an average person, from the visible spectrum range.

As a result of this (see the previous sub-items of the previous paragraph), it could become possible, when using mechanisms for the correction of the color rendering by means of the camera itself (e.g., by correction of the "white-balance") and/or by other means of the corresponding digital processing of images, to achieve the color rendering for all objects of the underwater imaging that could be maximum close to the natural one (that is, up to the one that is achieved for the same objects in air (within an air environment in an opened space, and not underwater)) regardless of the distance between these objects and the illumination device.

Of course, when using such illumination, if formats, which envisage "compression with losses" (e.g., JPEG, MPEG-4 etc.), are used during recording of the image, it will be necessary to perform the correction of the color rendering by means of the camera (e.g., the "white-balance" correction) yet at the shooting step (with a possible further corresponding digital processing of the image). However, in spite of certain possible inconveniences, it makes sense, since, as it is described by theory and demonstrated by research practice, the color rendering of such images is significantly better than the color rendering of the images, which were captured using an illumination device having a static spectrum (i.e. the one that does not change according to the ambient illumination spectrum) with or without use of mechanisms for the correction of the color rendering by means of the camera or by other means of the corresponding digital processing of images.

Hereinafter it will be considered that the image recording in the digital form is performed without using the image compression "with losses" (e.g., in the RAW-format) or with the preliminary correction of the color rendering (e.g., "correction of the white-balance") by means of the camera itself prior to the step of the image recording with the use of the image compression "with losses", and such preliminary correction of the color rendering by means of the camera is sufficient for storing the information about all the colors from the visible spectrum range, which are fixed by the camera photomatrix and are essential for perception by an average person.

A structure of an optoelectronic device for obtaining an ambient spectrum illumination and modifying an emitted light, which is described within "An optoelectronic device, system, and method for obtaining an ambient illumination spectrum and modifying an emitted light", is the closest structure to the proposed invention. This known device for obtaining the ambient illumination spectrum and modifying the emitted light comprises a plurality of light emitters, which are configured to illuminate an environmental area, at least one device for spectrum measurement that is configured to acquire information about the optical spectrum of the ambient illumination within said environmental area, and control means for modifying the emission of the light emitters on the basis of the acquired information about the optical spectrum (Patent No. RU 2565241, IPC H05B 37/02 (2016.01), publ. on 20 Oct. 2015, bul. No. 25 [1]). This structure is to be used within interactive illumination conditions, within interactive environments, where human actions and natural illumination within rooms are basic initial parameters. By measuring the ambient illumination spectrum and by modifying the optical spectrum of the emitted light depending on the optical spectrum obtained from the ambient illumination, this structure is capable of real-time specific detection of changes of the surrounding optical spectrum within a certain area. The structure of this inventive concept also enables photography and videography to "copy" the ambient illumination spectrum, but it is not adapted to be used underwater and it is not adapted to emit, underwater, such a light that upon reflection from the objects of the underwater shooting could be perceived by the photomatrix of the digital camera as identical or maximum close in terms of a ratio between illuminance levels obtained within different color channels of the camera and, correspondingly, the ambient natural illumination underwater reflected from the same objects of shooting. In this optoelectronic device, a miniaturized spectrometer is used to acquire information about the illuminance spectrum. However, for using underwater during the photography and/or videography in order to measure the ambient illumination spectrum to solve the posed task, it is more expedient to use, within the device for measuring the spectrum, a RGB-sensor that comprises a color separation means (the same as used within most of modern digital cameras, namely in the form of colored light filters having spectral characteristics of light transmission that is maximum close to the spectral characteristics of sensitivity of an average photomatrix of the digital camera within the corresponding color channel), and the corresponding quantity of illumination level measuring sensors, namely at least one sensor per each color channel. That is, in order to achieve a more precise result, for measuring the ambient illumination spectrum during underwater photography and/or videography, it is more expedient to use a spectrum measuring device that "sees" in the same way (and has the same mechanism of perception of a colored image) as the photomatrix of the digital camera that is completely absent in the structure of the known invention.

Based on the drawings, which are shown in the prototype of the proposed invention (Patent RU 2565241, FIG. 5, FIG. 6 of this invention), it can be concluded that this known technical solution is intended to be used within rooms and, thus, this optoelectronic device is not intended to be used at a depth underwater, it is not intended to create an additional illumination for the underwater photography and/or videography and, thus, the structure of this invention does not enable to provide a portable hand-held illumination device for the underwater photography and/or videography, as well as the structure of this invention does not enable to achieve, during the underwater photography and/or videography, such an illumination of the environment, objects, and living beings underwater that could be able to change depending on the ambient illumination spectrum and that could differ from the ambient natural illumination underwater in terms of the spectral characteristic, however, upon reflection from the objects under shooting, it could be perceived by the photomatrix of the digital camera within different color channels with such illuminance levels that the ratio between them coincides or is maximum close to the ratio of the corresponding illuminance levels acquired by the photomatrix of the digital camera from the light of the ambient natural illumination underwater reflected from the same objects under shooting. And, therefore, such structure of the known optoelectronic device does not enable to achieve a maximum close color rendering for the objects, which are located underwater at different distance from this optoelectronic device during the photography and/or videography. Furthermore, this known device is not intended to achieve, within the illumination spectrum of the environment underwater that is formed from the same operating optoelectronic device, such a ratio of mean illuminance levels for the corresponding colors of regions of the visible spectrum being essential for perception by an average person that does not exceed a preset certain value and, thus, the known optoelectronic device for obtaining the ambient illumination spectrum and for modifying the emitted light is not able to create such an illumination underwater that could enable to perform photo and video fixation, by photo and video camera, of such images, which will store the information about all the colors of the visible range of the spectrum being essential for perception by an average person.

The task of the proposed invention is to provide a portable hand-held illumination device for the underwater photography and/or videography such that its structure, during the underwater photography and/or videography, could enable photography and videography to achieve such an illumination of the environment, objects, and living beings from the operating portable hand-held illumination device that could be changed depending on the ambient illumination spectrum and that could differ from the ambient natural illumination underwater in terms of the spectral characteristic, however, upon reflection from the objects under shooting, it could be perceived by the photomatrix of the digital camera within different color channels with such illuminance levels that the ratio between them coincides or is maximum close to the ratio of the corresponding illuminance levels acquired by the photomatrix of the digital camera from the light of the ambient natural illumination underwater reflected from the same objects under shooting, thereby enabling to achieve a maximum close color rendering for objects, which are located underwater at a different distance from the portable hand-held illumination device during the photography and/or videography. At the same time, the task of the invention is also to achieve, within the illumination spectrum of the environment that is formed underwater from the operating portable hand-held illumination device, such a ratio of mean illuminance levels for the corresponding colors of regions of the visible spectrum being essential for perception by an average person that will not exceed a preset certain value within the structure of the portable hand-held illumination device, thereby enabling to create such an illumination underwater that could enable performing photo and video fixation, by photo and video camera, of such images, which will store the information about all the colors of regions of the visible spectrum being essential for perception by an average person.

SUMMARY OF THE INVENTION

The posed task is solved owing to an illumination device comprising a plurality of light emitters, which are configured to illuminate an environmental area, at least one device for spectrum measurement that is configured to acquire information about the optical spectrum of the ambient illumination within said environmental area, and control means for modifying the emission of the light emitters on the basis of the acquired information about the optical spectrum.

What is novel is that the illumination device is made as a portable hand-held illumination device 1 for the underwater photography and/or videography, the device comprising: a waterproof, pressure-retaining housing 2, at least one power element 16 that is arranged inside the waterproof, pressure-retaining housing 2, control elements 17 for controlling an operation of the portable hand-held illumination device 1, which are embedded into the structure of the waterproof, pressure-retaining housing 2, a plurality of light emitters 24 comprising at least three light emitters 3, 4, 5 having different spectral characteristics of the emitted light, a waterproof, transparent pressure-retaining material 14 that is configured to enable light beams to go through from the light emitters of the plurality of light emitters 24 and that is tightly coupled to the waterproof, pressure-retaining housing 2, an operating platform 13 of the portable hand-held illumination device 1, from which the light is emitted and which is closed by the waterproof, transparent pressure-retaining material 14, at least one spectrum measurement device that is made as a RGB-sensor 6 and that is formed of at least three illuminance level measurement sensors 7, 8, 9, which are configured to obtain information about the optical spectrum of ambient illumination within a usage environment of the portable hand-held illumination device 1 underwater, a programmed controller 15 that is arranged inside the waterproof, pressure-retaining housing 2. Therewith, the light emitters of the plurality of light emitters 24, the RGB-sensor 6, the programmed controller 15, the power element 16 and the control elements 17 for controlling the operation of the portable hand-held illumination device 1 are combined into a single electronic digital system 18. The programmed controller 15 is made as a control means for altering the emission of the light emitters of the plurality of light emitters 24 in a quantity of the at least three light emitters 3, 4, 5, and this programmed controller 15 is configured to obtain information from the at least one RGB-sensor 6, to process this information according to a preset program algorithm, and, according to results obtained from the at least one RGB-sensor 6, to transmit control signals to the electronic digital system 18 that, in turn, is set to alter emission power levels of the light emitters of the plurality of light emitters 24.

Therewith, each of the illuminance level measurement sensors 7, 8, 9 of the at least one RGB-sensor 6 comprises a separate colored light filter, in particular, the first illuminance level measurement sensor 7 comprises a red colored light filter 10, the second illuminance level measurement sensor 8 comprises a green colored light filter 11, and the third illuminance level measurement sensor 9 comprises a blue colored light filter 12. And the at least one RGB-sensor 6 is arranged within the structure of the portable hand-held illumination device 1 such that its structural elements in the form of the at least three illuminance level measurement sensors 7, 8, 9 together with the corresponding colored light filters 10, 11, 12 are able to perceive the light from the ambient illumination and to transmit an information about the illuminance levels of red, green, and blue components of the light that has passed through the corresponding red 10, green 11, and blue 12 colored light filters of the RGB-sensor 6 to the programmed controller 15 for further measuring the emission power levels of the light emitters of the plurality of light emitters 24. And, at the same time, the at least one RGB-sensor 6 is arranged within the structure of the portable hand-held illumination device 1 such that its structural elements, in particular, the at least three illuminance level measurement sensors 7, 8, 9 together with the corresponding colored light filters 10, 11, 12, do not perceive the light from the illumination that is created by the light emitters of the plurality of light emitters 24 at time points, when the information about the illuminance level of red, green, and blue components of the light passed through the corresponding red 10, green 11, and blue 12 colored light filters of the RGB-sensor 6 is received by the programmed controller 15 for further processing and determining an operation mode of the light emitters of the plurality of light emitters 24 as a result of this processing.

Therewith, the at least three light emitters 3, 4, 5 of the plurality of light emitters 24 are arranged on a plane of the operating platform 13 of the portable hand-held illumination device 1 under the waterproof, transparent pressure-retaining material 14 inside the waterproof, pressure-retaining housing 2. And each separate light emitter or each separate group of light emitters of the plurality of light emitters 24 is configured to be controlled by the programmed controller 15 to control the intensity level of the light emitted by them of from 0 to 100% regardless of the light emission intensity level of other light emitters and other groups of the light emitters of this plurality of light emitters 24, wherein the at least three light emitters 3, 4, 5 of the plurality of light emitters 24 are configured to emit the light of such different spectral characteristics, which enable to reproduce, with an accuracy that is preset in the program algorithm of the programmed controller 15, any color within the RGB color space that corresponds to the color that is fixed by the RGB-sensor 6 within the ambient illumination spectrum in the usage environment of the portable hand-held illumination device 1 underwater.

For some particular conditions and use cases, the proposed portable hand-held illumination device is characterized by the following features, which develop and specify the set of features of the independent claim.

The plurality of light emitters 24 in the quantity of at least three light emitters 19, 4, 5 comprises three multi-colored light emitters 19, 4, 5, wherein the first light emitter is configured to emit a white color light and is a white light emitter 19, the second light emitter is configured to emit a green color light and is a green light emitter 4, and the third light emitter 5 is configured to emit a blue color light and is a blue light emitter 5.

The plurality of light emitters 24 in the quantity of at least three light emitters 19, 4, 5 comprises three multi-colored groups of the light emitters, wherein the first group of the light emitters is configured to emit a white color light and is a white group 23 of the emitters that is formed by the white light emitters 19, the second group of the light emitters is configured to emit a green color light and is a green group 21 of the emitters that is formed by the green light emitters 4, and the third group of the light emitters is configured to emit a blue color light and is a blue group 22 of the emitters that is formed by the blue light emitters 5.

The plurality of light emitters 24 in the quantity of at least three light emitters 3, 4, 5, 19 comprises four multi-colored light emitters 3, 4, 5, 19, wherein the first light emitter is configured to emit a red color light and is a red light emitter 3, the second light emitter is configured to emit a green color light and is a green light emitter 4, the third light emitter 5 is configured to emit a blue color light and is a blue light emitter 5, and the fourth light emitter is configured to emit a white color light and is a white light emitter 19.

The plurality of light emitters 24 in the quantity of at least three light emitters 3, 4, 5, 19 comprises four multi-colored groups of the light emitters, wherein the first group of the light emitters is configured to emit a red color light and is the red group 20 of the emitters that is formed by the red light emitters 3, the second group of the light emitters is configured to emit a green color light and is the green group 21 of the emitters that is formed by the green light emitters 4, the third group of the light emitters is configured to emit a blue color light and is the blue group 22 of the emitters that is formed by the blue light emitters 5, and the fourth group of the light emitters is configured to emit a white color light and is the white group 23 of the emitters that is formed by the white light emitters 19.

The illumination device further comprises a waterproof display 32 that is connected to the electronic digital system 18.

INVENTIVE STEP

The structure of the portable hand-held illumination device for underwater photography and videography enables solving the posed technical tasks. The set of all essential features of the proposed illumination device, including its novel essential features, enables solving several posed technical tasks. The combined achievement of these several technical tasks is an achievement of a technical effect of the invention.

The portable hand-held illumination device 1 is intended to be used together (simultaneously or non-simultaneously) with a photo and video camera in order to create a certain color (illumination) when performing underwater photography and/or videography.

A part of the novel features of the invention is that the entire structure is made as the portable hand-held illumination device 1 for underwater photography and/or videography, and its structure consists of pieces and elements, which allow using this device at different depths underwater. Such novel features and structural elements of the invention are as follows: the waterproof, pressure-retaining housing 2, inside which the at least power element 16 is arranged; the control elements 17 for controlling the operation of the portable hand-held illumination device 1, which are embedded into the structure of the waterproof, pressure-retaining housing 2, the waterproof, transparent pressure-retaining material 14 that is configured to enable light beams to go through from the light emitters of the plurality of light emitters 24 and covers the operating platform 13 of the portable hand-held illumination device 1, from which the light is emitted. Such pieces of the structure as the waterproof, pressure-retaining housing 2 and the waterproof, transparent pressure-retaining material 14 are tightly interconnected and do not allow the water to penetrate into the device 1. The control elements 17 for controlling the operation of the portable hand-held illumination device 1 may be made as on/off switches, which also have a specialized waterproof and pressure-retaining protection. The combination of these listed pieces allows using the device 1 at different depths underwater with no water penetration into the structure.

The structural elements of the invention also are the programmed controller 15, the plurality of light emitters 24, and the RGB-sensor 6, which together with the power element 16 and the control elements 17 are joined to form the united electronic digital system 18.

The novel and original feature of the combination of the structural elements of the invention lies in that the plurality of light emitters 24 comprises at least three light emitters 3, 4, 5, which have different spectral characteristics of the light emitted by them, and wherein the RGB-sensor 6 consists of at least three illuminance level measurement sensors 7, 8, 9, which are configured to obtain information about the optical spectrum of the ambient illumination within the usage environment of the portable hand-held illumination device 1 underwater. The light emitters of the plurality of light emitters 24 in the quantity of at least three light emitters 3, 4, 5 are intended to emit light and to illuminate the environment, objects, and living beings underwater when performing underwater photography and/or videography by the digital photo and/or video camera.

The original and non-standard technical solution within the structure of the illumination device 1 lies in that, as compared to the existing illumination devices operated underwater, the present illumination device 1 comprises at least one device for measuring the ambient illumination spectrum that is made in the form of the RGB-sensor 6. The presence and the structure of the RGB-sensor 6, its location and interaction together with other elements and pieces of the illumination device 1 facilitates the solution of the posed task according to the present invention.

As noted above, the RGB-sensor 6 is a complex element that is formed by at least three illuminance level measurement sensors 7, 8, 9 and by at least three multi-colored light filters 10, 11, 12. Each of the illuminance level measurement sensors 7, 8, 9 of the at least one RGB-sensor 6 comprises a separate colored light filter. In particular, the first illuminance level measurement sensor 7 comprises the red colored light filter 10, the second illuminance level measurement sensor 8 comprises the green colored light filter 11, and the third illuminance level measurement sensor 9 comprises the blue colored light filter 12. Furthermore, the at least one RGB-sensor 6 is located within the structure of the portable hand-held illumination device 1 in such a way that its structural elements in the form of the at least three illuminance level measurement sensors 7, 8, 9, together with the corresponding multi-colored light filters 10, 11, 12, are capable of perceiving the light from the ambient illumination underwater. That is, the RGB-sensor 6 may be located and secured at any location of the waterproof, pressure-retaining housing 2. In various embodiments of the inventive structure, the RGB-sensor 6 may be mounted and secured:

- on an external plane of the waterproof, pressure-retaining housing 2 and in such a case, the external surface of the RGB-sensor 6 is rigidly closed on the top by the waterproof, transparent pressure-retaining material 33;
- within an opening of the wall of the waterproof, pressure-retaining housing 2 and in such a case, the external surface of the RGB-sensor 6 is rigidly closed on the top by the waterproof, transparent pressure-retaining material 33.

In any of said cases, the RGB-sensor 6 is located in such a way that the three illuminance level measurement sensors 7, 8, 9, together with the corresponding multi-colored light filters 10, 11, 12, are physically directed outwardly of the surrounding underwater environment and the natural illumination.

The RGB-sensor 6 is a measurement device in the form of a structural combination of the three illuminance level measurement sensors 7, 8, 9, which simultaneously represent measurement converters of the illuminance value being measured. That is, within the structure of the present invention, the RGB-sensor 6 in the form of the combination of the three illuminance level measurement sensors 7, 8, 9, together with the corresponding multi-colored light filters 10, 11, 12, is capable of measuring the illuminance levels of the light from the ambient illumination underwater that has passed through the corresponding multi-colored light filters 10, 11, 12. The RGB-sensor 6 in the form of the combination of the three illuminance level measurement sensors 7, 8, 9 generates an output signal or output signals, which are transferred to the programmed controlled 15 by means of the electronic digital system 18. Such output signal or output signals is/are represented by the information about the illuminance level of the red, green, and blue components of the light that has passed through the corresponding red 10, green 11, and blue 12 colored light filters of the RGB-sensor 6. It should be noted that it is obvious within the structure of the invention that the RGB-sensor 6 together with the electronic digital system 18 comprises all the necessary electronic modules and elements in order for the programmed controller 15 to obtain ("catch" in the electronic digital and/or analog form), at necessary time points, the information about the illuminance levels within the corresponding color channels that is fixed by the illuminance level measurement sensors 7, 8, 9 at the present point of time. That is, the electronic digital system 18 operates not only to receive the control signals from the programmed controller 15 and to alter emission power levels of the light emitters of the plurality of light emitters 24 (according to these control signals from the programmed controller 15), but also to "catch" the information from the RGB-sensor 6 and to "transmit" this information (or to transmit this information processed by the electronic digital system 18) to the programmed controller 15. This is how the programmed controller 15 receives from the RGB-sensor 6 the necessary information about the spectrum of the ambient illumination, namely, about the illuminance levels of at least red, green, and blue components of the ambient natural illumination underwater.

The programmed controller 15 is located inside the waterproof, pressure-retaining housing 2. The novel features of the invention lie in that the programmed controller 15 is configured:
  as a means for obtaining and processing the information from the at least one RGB-sensor 6 that comes to the programmed controller 15 through the electronic digital system 18 from the RGB-sensor 6, and this information is processed by the programmed controller 15 according to the preset program algorithm;
  as a control means for altering the emission by the plurality of light emitters 24 that occurs due to the fact that the programmed controller 15 (upon receipt and processing of the information from the RGB-sensor 6) transmits the control signals to the electronic digital system 18 that, in turn, is set to alter the emission power levels of the light emitters of the plurality of light emitters 24.

Therefore, the combination of the presence of the RGB-sensor 6 in the form of the three illuminance level measurement sensors 7, 8, 9, together with the corresponding multi-colored light filters 10, 11, 12, the special location of the RGB-sensor 6 within the inventive structure, the capability of the RGB-sensor 6 to perceive the ambient illumination, the capability of the programmed controller 15 to receive (through the electronic digital system 18) the necessary information about the optical spectrum of the ambient illumination from the RGB-sensor 6, and the capability of this programmed controller 15 to transmit the control signals to the electronic digital system 18 that may alter the emission power levels of the light emitters of the plurality of light emitters 24 allows to achieve, in real time, such an illumination of the environment, objects, and living beings underwater that could be able to change depending on the ambient illumination spectrum.

The novel feature of the invention lies in that the light emitters of the plurality of light emitters 24 are arranged on a plane of the operating platform 13 of the portable hand-held illumination device 1 under the waterproof, transparent pressure-retaining material 14 inside the waterproof, pressure-retaining housing 2. That is, the light emitters of the plurality of light emitters 24 are closed and protected from water penetration by the waterproof, transparent pressure-retaining material 14 and by the waterproof, pressure-retaining housing 2. Thus, such a structural solution allows using the portable hand-held illumination device at different depths underwater to create the illumination during the underwater photography and/or videography. The novel feature also lies in that this plurality of the light emitters 24 comprises at least three light emitters 3, 4, 5, which have different spectral characteristics of the emitted light. Therewith, the novel feature lies in that each separate light emitter or each separate group of the light emitters (created from several light emitters having the same or maximum close spectral characteristic of the emitted light) of the plurality of light emitters 24 is configured to be controlled by the programmed controller 15 to control the intensity level of the light emitted by them of from 0 to 100% regardless of the light emission intensity level of other light emitters and other groups of light emitters of this the plurality of light emitters 24. That is, each light emitter, e.g., 3, 4, 5, or each group of these light emitters is/are capable of emitting the light having different intensity independently of each other. For example, if the plurality of light emitters 24 comprises three groups of the light emitters, wherein the first group is formed (e.g.) by four red (or white) light emitters, the second group is formed by four green light emitters, and the third group is formed by four blue light emitters, then, according to the control signals of the programmed controller 15, all four red (or white) emitters may emit the light having the intensity of (e.g.) 20%, all four green light emitters may emit the light having the intensity of (e.g.) 60%, and all four blue light emitters may emit the light having the intensity of (e.g.) 100% (the above-mentioned emission intensity levels of the red, green, and blue light emitters correspond to operation of the illumination device 1 underwater according to the spectrum of the ambient illumination at the depth of about 5 meters within a certain water body). Furthermore, in some embodiments of the invention, the light emitters of a single group (e.g., of the group of the red light emitters) may be configured to control the emission power independently, i.e., each separate light emitter of a single group may emit the light (according to the control signals of the programed controller 15) independently and with a different intensity relative to other light emitters of this group.

In any case, the structure of the portable hand-held illumination device 1 is made such that separate groups of the light emitters (e.g., the group of red 20, the group of green 21, and the group of blue 22 light emitters) are capable of operating (emitting the light) independently of each other as dependent on the control signals of the programmed controller 15 and due to the corresponding operation of the electronic digital system 18 that alters the emission power levels of the light emitters of the plurality of light emitters 24.

As noted above, the structure of the invention implies that the plurality of light emitters 24 comprises at least three light emitters 3, 4, 5, which have different spectral characteristics of the emitted light. It means that each of the (minimum quantity) three light emitters 3, 4, 5 has its own spectral characteristic that differs from the spectral characteristics of two other light emitters. Therewith, it is not obvious that in the claimed structure, in order to achieve the posed task, the above-mentioned three light emitters 3, 4, 5 must have such different spectral characteristics, which, during calculating the necessary emission power levels of each of them (according to a certain programmed algorithm of the programmed controller 15), would not provide negative values (because it is physically impossible to emit the light with a negative power), or these negative values could be replaced with certain positive values, while solving the posed task of the present invention. Considering the fact that the color separation into three components (red, green, and blue components) is used during fixation of colored images by a standard photo and/or video camera, it is logical (but optional) that the corresponding spectrum component will be predominant in the spectral characteristic of the three above-mentioned light emitters 3, 4, 5. For example, the light emitter 3 may be configured to emit the red color light, the light emitter 4 may be configured to emit the green color light, and the light emitter 5 may be configured to emit the blue color light. It is non-obvious and unexpected within the claimed structure that, considering the special nature of the natural daylight illumination underwater, and the posed task of the present invention, for the light emitter corresponding to a long-wave ("red") component of the combined illumination, it is fully applicable to use the light having the spectrum that sufficiently comprises long-wave components of the visible spectrum, however, other components of the visible spectrum are predominant. In this case, it is fully applicable to use the light emitter having, e.g., not red, but cold-white color, or even yellow-green color, which initially seem to be suitable for the "green" and not for the "red" color channel, however, the presence of the long-wave components of such light, in spite of the predominance of the "green" component in the cold-white and in the yellow-green color, is fully sufficient to create such a combined composite illumination that could meet the posed task of the invention. Moreover, in some cases, use of the emitter having the cold-white color is more reasonable than use of the corresponding red color emitter. Also, it should be noted that, considering the special nature of the natural daylight illumination underwater and the posed task of the present invention, a light emitter having such spectral characteristics, wherein the presence of the long-wave (and short-wave, for some water bodies) component could be minimized, must be used for the emitter of the "green" component of the combined illumination. That is, this must be not a simple light emitter, wherein the "green" component of the visible spectrum is predominant, but, as it is shown by the research practice, this must be a light emitter (in fact, of the green color), wherein the light emission intensity within ranges of 350 . . . 450 nm and 580 . . . 700 nm is significantly (preferably, at least by 5 . . . 10 times) smaller than the emission intensity within the range of 510 . . . 550 nm.

The same relates to the possibility of using the at least three light emitters 3, 4, 5 in an extended arrangement, when the plurality of light emitters 24 may be formed of the three groups of the light emitters (e.g., of the groups 20, 21, 22). Having such a structural solution, each group of the light emitters comprises several light emitters having the same (or maximum close) own spectral characteristics relative to each other, while this spectral characteristic being different from the spectral characteristic of the light emitters of two other groups of the light emitters.

Thus, the novel feature of the invention lies in that the at least three light emitters 3, 4, 5 of the plurality of light emitters 24 are configured to emit the light having such different spectral characteristics, which provide reproduction of any color within the RGB color space, with an accuracy that is predetermined within the program algorithm of the programmed controller 15, the color corresponding to the color that is fixed by the RGB-sensor 6 within the range of the ambient illumination in the usage environment of the portable hand-held illumination device 1 underwater.

Thus, during the operation of the device 1, firstly, the RGB-sensor 6 in the form of the three illuminance level measurement sensors 7, 8, 9 together with the corresponding multi-colored light filters 10, 11, 12 fixes the color (i.e., the RGB-sensor 6 fixes the values, which correspond to coordinates within the RGB color space) within the ambient illumination spectrum in the usage environment of the portable hand-held illumination device 1 underwater. That is, the at least three illuminance level measurement sensors 7, 8, 9, together with the corresponding multi-colored light filters 10, 11, 12, perceive the light from the ambient illumination, and then, by means of the electronic digital system 18 and through the electronic digital system 18, they "output" the information about intensity levels of the red, green, and blue components of the light that has passed through the corresponding red 10, green 11, and blue 12 colored light filters of the RGB-sensor 6 to the programmed controller 15 in the electronic digital and/or analog form. Substantially, the RGB-sensor 6 in the form of the three illuminance level measurement sensors 7, 8, 9, together with the corresponding multi-colored light filters 10, 11, 12, is a device that receives (perceives) the light from the ambient illumination, fixes the values corresponding to the coordinates within the RGB color space, and, by means of the electronic digital system 18, transmits this information to the programmed controller 15. Then, the programmed controller 15, due to the operation of the predetermined algorithm and by means of the electronic digital system 18, receives, at the specific time points, the information about the intensity levels of the red, green, and blue components of the light that has passed through the corresponding red 10, green 11, and blue 12 colored light filters from the RGB-sensor 6. Then, the programmed controller 15 transmits the control signals to the electronic digital system 18 that, in turn, alters the emission power levels of the at least three light emitters 3, 4, 5 (of the plurality of light emitters 24), which have different spectral characteristics of the emitted light. Therewith, the program algorithm of the programmed controller 15 transmits the control signals to the electronic digital system 18 that alters the emission power levels of the at least three light emitters 3, 4, 5 in such a way that these light emitters 3, 4, 5 reproduce any color within the RGB color space, with an accuracy that is predetermined within the program algorithm of the programmed controller 15, the color corresponding to the color that is fixed by the RGB-sensor 6 within the range of the ambient illumination in the usage environment of the portable hand-held illumination device 1 underwater.

In some embodiments of the claimed structure of the portable hand-held illumination device 1, the RGB-sensor 6 may be configured in such a way that it is not "an initiator" of the transmission of the information about the intensity levels of the red, green, and blue light components, and the RGB-sensor 6 is set in such a way that it does not direct (does not transmit), by its own, the signals with the information about the illuminance levels of the red, green, and blue light components to the programmed controller 15. The RGB-sensor 6 is in a passive stand-by state and it is ready to make the programmed controller 15 capable of "catching" all the necessary information at any point in time. Depending on types and species of the constituent structural elements of the RGB-sensor 6, it (the RGB-sensor 6) may, by means of the electronic digital system 18, and through the electronic digital system 18, provide (direct) the information about intensity levels of the red, green, and blue light components in electronic digital or analog form to the programmed controller 15, and the programmed controller 15, due to the operation of the predetermined program algorithm, is "a main initiator" of collection of the information about intensity levels of the light components from the RGB-sensor 6.

In other embodiments of the claimed structure of the portable hand-held illumination device 1, the RGB-sensor 6 may be an initiator of the transmission of the information about intensity levels of the red, green, and blue light components of the ambient illumination, however, in this case, it is necessary for such information to come from the RGB-sensor 6 to the programmed controller 15 with a certain periodicity for the programmed controller 15 to be capable of "reacting" rather operatively to alterations within the ambient illumination spectrum and of directing the corresponding signals to the electronic digital system 18 to alter the emission power levels of the light emitters of the plurality of light emitters 24.

In order to provide a detailed disclosure of the subject matter of the invention, it is suggested to consider an example of such structure of the present invention, wherein the plurality of light emitters 24 within the illumination device 1 comprises at least three light emitters (e.g., 19, 4, 5) of white, green, and blue color, which are made as LED-light diodes.

The Plot 2 (FIG. 7) shows spectral characteristics of "warm spectrum" (by solid line "W") and "cold spectrum" (by dashed line "C") light diodes, which were used during research works with equivalent color temperatures of an order of 3000 K and 6500 K respectively. The Plot 2 (FIG. 7) depicts a wavelength (from 350 to 750 nm) in the horizontal direction and "the relative emission intensity" (from 0 to 1) in the vertical direction.

As it is seen from the Plot 2 (FIG. 7), there is a highly expressed peak in the range of 440 . . . 460 nm, and "a gap" in the range of 470 . . . 510 nm within the spectral characteristic of the white color light diodes, which is caused by the specific nature of the structure of modern light diode lamps made according to LED-technology. Of course, it is bad for illumination, and it could be better to use those light emitters, which would have the spectral characteristic that would not have such "gaps" and "peaks", in the plurality of light emitters 24, but, as an example, let's consider the embodiment utilizing these types of the light emitters.

In the presently described example:
the "blue" light emitter 5 is made as a LED-light diode having the spectral characteristic that is denoted by the dashed line "BL" in the Plot 3 (FIG. 8).
the "green" light emitter 4 is made as a LED-light diode having the spectral characteristic that is denoted by the solid line "GR" in the Plot 3 (FIG. 8).
the "white" light emitter 19 is made as a "cold color" LED-light diode having the spectral characteristic that is denoted by the dashed line "C" in the Plot 2 (FIG. 7).

The Plot 3 (FIG. 8) depicts a wavelength (from 350 to 700 nm) in the horizontal direction and "the relative emission intensity" (from 0 to 1.6) in the vertical direction.

Since the task of the invention is to provide a structure that creates such an illumination that upon reflection from the objects of the shooting could be perceived by the photomatrix of the digital camera within the red, green, and blue color channel with such illuminance levels that the ratio between them coincides with or is maximum close to the ratio of the corresponding illuminance levels acquired by the photomatrix of the digital camera from the ambient natural illumination light underwater that is reflected from the objects under shooting, a perfect case would be the one, where the spectral characteristics of sensitivity (for the red, green, and blue color channels) in the RGB-sensor 6 and the photomatrix of the digital camera being used would coincide. That is, it is perfect for the RGB-sensor 6 to "see" the colors in the same way as the photo and video camera.

Of course, it is not possible to use a specialized RGB-sensor for each specific photo and video camera, so the present example describes such RGB-sensor 6 having spectral characteristics of the sensitivity within the red, green, and blue color channel, which maximally coincide with the spectral characteristics of sensitivity of the known photomatrix Sony ICX285AQ that was chosen as a real example of the photomatrix in this case:

The Plot 4 (FIG. 9) depicts spectral characteristics of sensitivity of the RGB-sensor 6 that is used for the present example. Letters "B", "G", "R" denote spectral characteristics of sensitivity for the blue, green, and red color channel of the RGB-sensor 6 respectively.

The Plot 4 (FIG. 9) depicts a wavelength (from 350 to 750 nm) in the horizontal direction and "the relative emission intensity" (from 0 to 1) in the vertical direction.

When using digital cameras comprising a photomatrix that differs, by spectral characteristics, from the photomatrix that was chosen as a real example of the photomatrix in the present example of the invention, of course, there will be a certain difference in the color rendering of the objects (relative to the photomatrix taken as a real example) illuminated with the illumination device 1 and with the natural light underwater, however, this difference will be insignificant, because, as the practice shows, the spectral characteristics of different photomatrixes are very similar, while an intersection of the sensitivity plots for the red, green, and blue color channel of the photomatrixes usually occurs approximately within the same spectrum region (the blue and the green color channels are usually "intersected" in the range of 480 . . . 510 nm that corresponds to the blue-green color, while the green and the red color channels are usually "intersected" in the range of 570 . . . 590 nm that corresponds to the yellow color).

Returning to the posed task and to the present example, it is necessary to create, by means of the above-mentioned three light emitters 19, 4, 5 (of the white, green, and blue color respectively), which emit light with different power levels, such a "composite" light that could meet the above-mentioned requirement (regarding the color equivalence of perception of the natural illumination underwater reflected from the objects of the shooting and of the illumination from the illumination device 1 reflected from the objects of the shooting by the photomatrix of the digital camera). To solve this task, it is necessary to find relative emission power levels $W_{torch}$, $G_{torch}$, and $B_{torch}$, which have values from 0 to 100%, respectively, for the white 19, green 4, and blue 5 color light emitters, which will meet the conditions of the posed task.

One of possible methods for finding such values $W_{torch}$, $G_{torch}$, and $B_{torch}$ is stated below.

Since it is physically impossible to reproduce such an artificial illumination that, at the same time, from one hand, could differ from the ambient natural illumination underwater in terms of the spectral characteristic, and, on another hand, upon reflection from the various objects having significantly different spectral characteristics of the light reflected by them, could reproduce strictly the same colors within the RGB color space as the light of the ambient illumination underwater that is reflected from the same objects, thus, in order to solve the task of identity (or maximum approximation) of the corresponding colors within the RGB color space, which are formed upon reflection of the artificial and natural illumination from the objects of the shooting, let's pose the task as reproduction of such an artificial illumination from the illumination device 1 that upon reflection from the white color object could reproduce the same (or maximum close) color within the RGB color space as the light from the ambient illumination underwater that is reflected from the same white color object. Moreover, preservation of white objects as white (and gray ones as gray) is more important for an average person's eye than more accurate repetition of color shadings. Thus, this criterion (of identity or maximum correspondence of "white balance") is more expedient.

The illuminance level that will be fixed by the corresponding color channel of the RGB-sensor 6 (and the corresponding color channel of the photomatrix of the digital camera) from the light formed by the operating illumination device 1 and reflected from the white color object (i.e., such an object that reflects a monochromatic component of the light with the identical reflection index for any wavelength of the visible spectrum range) is a value that is proportional to:

$$\int_a^b (X\text{sensor}(\lambda) \cdot F(\lambda)) d\lambda$$

where $X\text{sensor}(\lambda)$ is a function of the relative sensitivity level of the RGB-sensor of the corresponding color channel as dependent on the wavelength $\lambda$.

$F(\lambda)$ is a function of the relative illuminance level formed by the illumination device 1 as dependent on the wavelength $\lambda$;

[a ... b] is a section of the spectrum range, which the RGB-sensor is sensitive to, e.g., from 350 nm to 750 nm.

Let's take $R_{dl}$, $G_{dl}$, $B_{dl}$ as the corresponding relative illuminance levels fixed by the RGB-sensor 6 in the red, green, and blue color channels from the ambient natural illumination underwater. Therefore, if the RGB-sensor 6 fixes the light formed by the illumination device 1 that is reflected from the white color object with the same illuminance levels (or with levels, which are proportional to the same relative illuminance levels), the posed task will be fully resolved.

The function $F(\lambda)$ for the illumination device 1 may be presented as:

$$F(\lambda) = W_{torch} \cdot \text{white}_{torch}(\lambda) + G_{torch} \cdot \text{green}_{torch}(\lambda) + B_{torch} \cdot \text{blue}_{torch}(\lambda)$$

Where $W_{torch}$ is a sought relative emission power level of the white light emitter 19;

$G_{torch}$ is a sought relative emission power level of the green light emitter 4;

$B_{torch}$ is a sought relative emission power level of the blue light emitter 5;

$\text{white}_{torch}(\lambda)$ is a function of the spectral characteristic of the white light emitter that takes a value of the relative emission intensity level depending on the wavelength $\lambda$;

$\text{green}_{torch}(\lambda)$ is a function of the spectral characteristic of the green light emitter that takes a value of the relative emission intensity level depending on the wavelength $\lambda$;

$\text{blue}_{torch}(\lambda)$ is a function of the spectral characteristic of the blue light emitter that takes a value of the relative emission intensity level depending on the wavelength $\lambda$.

Values, which are obtained by the RGB-sensor 6 for the color channel "X" (for the red, green, and blue color channel of the formula are the same) will be equal to:

$$X_{dl} = \int_a^b (X\text{sensor}(\lambda) \cdot F(\lambda)) d\lambda =$$

$$\int_a^b X\text{sensor}(\lambda)(W_{torch} \cdot \text{white}_{torch}(\lambda) + G_{torch} \cdot \text{green}_{torch}(\lambda) + B_{torch} \cdot \text{blue}_{torch}(\lambda)) d\lambda =$$

$$= W_{torch} \int_a^b (X\text{sensor}(\lambda) \cdot \text{white}_{torch}(\lambda)) d\lambda +$$

$$G_{torch} \int_a^b (X\text{sensor}(\lambda) \cdot \text{green}_{torch}(\lambda)) d\lambda +$$

$$B_{torch} \int_a^b (X\text{sensor}(\lambda) \cdot \text{blue}_{torch}(\lambda)) d\lambda =$$

$$= W_{torch} K_{Xw} + G_{torch} K_{Xg} + B_{torch} K_{Xb},$$

where $$K_{Xw} = \int_a^b (X\text{sensor}(\lambda) \cdot \text{white}_{torch}(\lambda)) d\lambda,$$

$$K_{Xg} = \int_a^b (X\text{sensor}(\lambda) \cdot \text{green}_{torch}(\lambda)) d\lambda,$$

$$K_{Xb} = \int_a^b (X\text{sensor}(\lambda) \cdot \text{blue}_{torch}(\lambda)) d\lambda,$$

In fact, $K_{Xw}$, $K_{Xg}$, $K_{Xb}$ are values, which are obtained by the corresponding color channel of the RGB-sensor 6 when illuminating, respectively, exclusively by the white 19, green 4, or blue 5 light emitter of the illumination device 1 that illuminates the light at the power of 100%. These coefficients can be easily obtained by performing a measurement at the manufacturing step of the illumination device 1.

Thus, to find the values $W_{torch}$, $G_{torch}$, and $B_{torch}$, it is sufficient to solve the system of three linear equations with three variables:

$$K_{rb} \cdot B_{torch} + K_{rg} \cdot G_{torch} + K_{rw} \cdot W_{torch} = R_{dl}$$

$$K_{gb} \cdot B_{torch} + K_{gg} \cdot G_{torch} + K_{gw} \cdot W_{torch} = G_{dl}$$

$$K_{bb} \cdot B_{torch} + K_{bg} \cdot G_{torch} + K_{bw} \cdot W_{torch} = B_{dl}$$

Where the variables are $W_{torch}$, $G_{torch}$, and $B_{torch}$, while the rest of the variables are given.

The physical sense of the coefficients $K_{XY}$ is an "influence" coefficient onto the X-channel of the RGB-sensor of the Y-color emitter. Since there are three linear equations with three variables, such equation in a non-degenerated case has a solution. Therefore, it is possible to find sought relative emission power levels $W_{torch}$, $G_{torch}$, and $B_{torch}$ by solving the above-described system of linear equations by using the known methods and algorithms for the solution, which may be implemented and automated in the programmed controller 15.

In order to identify whether this system of linear equations has a solution when using specific light emitters and whether the solution is the only one solution, let's present the system of linear equations in the matrix form. Where:

$$M \cdot x = v,$$

где

$$M = \begin{pmatrix} K_{rb} & K_{rg} & K_{rw} \\ K_{gb} & K_{gg} & K_{gw} \\ K_{bb} & K_{bg} & K_{bw} \end{pmatrix}, x = \begin{pmatrix} B_{torch} \\ G_{torch} \\ W_{torch} \end{pmatrix}, v = \begin{pmatrix} R_{dl} \\ G_{dl} \\ B_{dl} \end{pmatrix}$$

If a continuant (a determinant) of the matrix det(M)≠0, then the system of such linear equations will have a solution, and such a solution is the only one solution.

For this specific example utilizing the RGB-sensor 6, whose spectral characteristics of the sensitivity in different color channels are depicted in the Plot 4 (FIG. 90, and utilizing the light emitters 19, 4, 5 of, respectively, white, green, and blue color, with the spectral characteristics depicted in the Plot 2 (FIG. 7) (by a dashed line for the white light emitter) and in the Plot 3 (FIG. 8) (for blue and green light emitter), in the course of research works the following values of the matrix M were obtained:

$$M = \begin{pmatrix} 0.058 & 0.092 & 0.264 \\ 0.23 & 0.539 & 0.37 \\ 0.417 & 0.197 & 0.262 \end{pmatrix}$$

Its continuant (determinant) equals to det (M)≈−0.035. That is, the system of the above-mentioned linear equations always has only one solution.

However, and as it is shown by the research practice, for certain values $R_{dl}$, $G_{dl}$, $B_{dl}$, which occur during fixation by the RGB-sensor 6 underwater starting from a certain depth, the solution for the $W_{torch}$ (and also the $B_{torch}$ within certain water bodies) may take negative (in the practice—weakly negative) values that is non-acceptable from the point of a technical implementation—it is impossible to emit a light having a negative illuminance. This is caused by the fact that the influence of the green color emitter 4 on the "red" illuminance sensor 7 (and also onto the "blue" illuminance sensor 9 within certain water bodies) of the RGB-sensor 6 exceeds the illuminance level that is fixed in the "red" (and also in the "blue" one, within certain water bodies) channel of the RGB-sensor 6. In this case, as one of embodiments, but without limitation thereto, for the value $W_{torch}$ it is possible to take a predetermined "minimum allowable" positive value $Y_{min}$ that is a constant or is calculated according to a certain formula as dependent on preliminary obtained values $G_{torch}$ and $B_{torch}$, and to re-calculate the sought values $G_{torch}$ and $B_{torch}$ considering the influence of the white light emitter 19 onto the green and blue color channel, thereby solving such a system of two linear equations with two variables:

Where the variables are still $B_{torch}$ and $G_{torch}$, while the $W_{torch}$ already equals to $Y_{min}$.

$$K_{gb} \cdot B_{torch} + K_{gg} \cdot G_{torch} = G_{dl} - K_{gw} \cdot W_{torch}$$

$$K_{bb} \cdot B_{torch} + K_{bg} \cdot G_{torch} = B_{dl} - K_{bw} \cdot W_{torch}$$

In this example, the continuant (determinant) of the matrix of this system of linear equations is not equal to zero, thus, the system of the following two linear equations with two variables always has only one solution.

In case negative values again occur during solving this system of linear equations as well (most likely, this may occur for the blue component $B_{torch}$ within certain water bodies), as one of embodiments, but without limitation thereto, it may be possible to set these (negative) sought values to zero.

In order to accomplish the second part of the technical task, namely: to emit the light, wherein the ratio of mean illuminance levels of the ambient illumination for the regions of the visible spectrum, which correspond to the ones sufficient for the perception by an average person, must not exceed a predetermined certain value, after the values $W_{torch}$, $G_{torch}$, and $B_{torch}$ are obtained, as one of embodiments, but without limitation thereto, it is possible to check whether $G_{torch}$ and $B_{torch}$ exceed the value $W_{torch}$ by more than a certain number of times. If so, then it is necessary to calculate "a minimum allowable value" $Y_{min}$ as a value that will meet the above-mentioned proportion, to set the $W_{torch}$ to $Y_{min}$, and to re-calculate (to calculate again) $G_{torch}$ and $B_{torch}$ according to the above-mentioned algorithm.

After the values $G_{torch}$, $B_{torch}$, and $W_{torch}$ are obtained according to the preliminary algorithm, these values must be "normalized", i.e., to divide all three values by the maximum one of these three values. Therefore, the one being the maximum of the values $G_{torch}$, $B_{torch}$, and $W_{torch}$ obtained after the "normalization" will be equal to 1 (or 100%).

The assignment of the minimum allowable certain positive value $Y_{min}$ for the torch (in case if $W_{torch} < Y_{min}$) is also useful in cases when the ambient illumination is below the sensitivity threshold of the RGB-sensor 6 (e.g., at night). In this case, $W_{torch}$ will take the value $Y_{min}$ (and after the "normalization"—100%), other values $G_{torch}$ and $B_{torch}$ will take zeros and, as a consequence, the illumination device 1 will start illuminating with usual white light, i.e., the white light emitter 19 will operate with the power of 100%, while other emitters will be turned off.

In one of technical embodiments of the invention, and when the structure of the illumination device 1 comprises a waterproof screen 32, the selection of the value of "maximum allowable ratio between max ($G_{torch}$, $B_{torch}$) and $W_{torch}$" may be provided to the user, (max (a, b) is a function that returns the maximum value: a, if a≤b, or b, if b>a). Selection or change of the above-mentioned value may be performed by means of the control elements 17 in the corresponding menu item that is displayed on the waterproof display 32. It may be useful so as to enable the user to select the "degree of approximation" of the light from the illumination device 1 to the ambient natural illumination or to the "usual" white color illumination. In the course of research work, it was found that the optimal value of this ratio max ($G_{torch}$, $B_{torch}$)/$W_{torch}$ is a value within the range of 16 . . . 32, however, it is merely a recommended value.

Of course, in case (and, more likely, this will occur starting from a certain depth—most likely starting from 15-20 meters depending on a type of the water body, or if the ambient illumination is not sufficient, e.g., at night or within a closed space underwater) when the value $W_{torch}$ is obtained not by means of solving the first system of linear equations, but by means of correction (e.g., by setting the value $W_{torch}$ to a certain value due to the fact that $W_{torch}$ has taken a negative value, or due to the necessity of execution of the second condition of the technical task regarding non-exceedance of the ratio between mean illuminance levels for the regions of the visible spectrum, which correspond to colors being significant for perception by an average person), in this case, there will be no light obtained from the illumination device 1 that upon reflection from the white color object will be perceived by the photomatrix of the digital camera in the different color channels with such illuminance levels that the ratio between them coincides with the ratio of the corresponding illuminance levels acquired by the photomatrix of the digital camera from the light reflected from the white color object of the natural ambient illumination underwater, however, this light (from the illumination device 1) upon reflection from the white color object will be perceived by the photomatrix of the digital camera in the different color channels with such illuminance levels that the ratio between them is maximum close to the ratio of the corresponding illuminance levels obtained by the photomatrix of the digital camera from the light reflected from the white color object from the natural ambient illumination underwater. The same may be stated regarding objects of colors other than white, i.e., regarding objects having any spectral characteristics of the light reflected from them. Therefore, the posed technical task is fully resolved.

As an example, the Plot 5 (FIG. 10) depicts the spectral characteristic of the natural daylight (by the dashed line "E") that has passed inwardly through 10 meters of water of a certain typical water body and the spectral characteristic of the light from the illumination device 1 (the solid line "F" in the Plot 5, FIG. 10) comprising the above-mentioned blue, green, and white color emitters that emit the light at the depth of 10 meters according to the spectrum of the ambient natural daylight illumination The Plot 5 (FIG. 10) shows the relative emission intensity (from 0 to 2) in the vertical direction, the wavelength (from 350 nm to 700 nm) in the horizontal direction.

In this example, the blue color emitter 5 performs the emission with the relative power of 100%, the green color emitter 4 performs the emission with the relative power of 51.4%, the white color emitter 19 performs the emission with the relative power of 27.5%. These coefficients were found according to the above-mentioned algorithm, and it was physically checked that the RGB-sensor 6 really perceives such "composite" illumination from the illumination device 1 in the same way as the light that has passed through 10 meters of water of a certain water body, and therewith, the same ratios of the values for the red, green, and blue light components are obtained from the measurement sensors 7, 8, 9 with the relative accuracy of 99%.

As it is seen from the Plot 5 (FIG. 10), the spectral characteristic of the light from the illumination device 1 that emits the light at the depth of 10 meters according to the spectrum of the ambient illumination, rather accurately repeats, in the region of 510 . . . 700 nm, the spectral characteristic of the light of the natural daylight illumination that has passed within through 10 meters of water of a certain water body. In other regions of the visible spectrum (in fact, within the "blue" region), the above-mentioned spectral characteristics (sometimes significantly) differ between each other (and this is caused by the fact that the present example utilized at least three light emitters of the plurality of light emitters 24 made according to the LED-technology); however, an average human vision is not so sensitive to shades of colors within the "blue" region, and such a difference is not fundamental: as an example, a simple LED-lamp of a "cold white" color may be mentioned (its spectral characteristic is depicted in the Plot 2 (FIG. 7) by the dashed line "C") that also has the same spectral characteristics within the "blue" region of the visible spectrum, however, the average human vision perceives the illumination from such LED-lamp of the "cold white" color as being quite acceptable and almost similar to the natural daylight illumination.

In order to understand which image will be obtained after the "white-balance" correction and a certain color correction (that results in a certain "enhancement" of colors of the "red" range, while other colors, including the "composite" white and its shadings—gray color remain unchanged, which is very important) for a photo or a video that was fixed (as an example, at depths of 10, 15, 20, and 30 meters) underwater by means of a certain digital camera using the present illumination device 1 and using a usual underwater illumination device that emits the "cold" white color (its spectral characteristic is depicted in the Plot 2 (FIG. 7) by the dashed line "C") regardless of the spectrum of the ambient daylight illumination, in the course of research works, the corresponding data for building the Plots 6, 7, 8, 9 (FIGS. 11, 12, 13, 14 respectively) were obtained, which depict the relative light intensity that is emitted by a certain device for displaying a digital image (e.g., a computer monitor), if the image that was taken underwater by means of the digital camera (at depths of 10, 15, 20, and 30 meters respectively) and illuminated exclusively by an illumination device (in the Plots 6, 7, 8, 9 (FIGS. 11, 12, 13, 14 respectively)) with the solid line "H" being the illumination device 1, the dashed line "I" being the "usual" illumination device that emits the "cold white" color) had a presence of the object, which reflects the light with the reflection coefficient of 100% only at one region of the visible spectrum having a width of 10 nm, within the entire frame. The horizontal direction in the Plots 6, 7, 8, 9 (FIGS. 11, 12, 13, 14 respectively) depicts a wavelength (from 350 to 700 nm) that corresponds to the central portion of the above-mentioned region; the vertical direction depicts the relative light intensity (from 0 to 1.2).

As it is seen from the Plots 6, 7, 8, 9 (FIGS. 11, 12, 13, 14 respectively), the spectral characteristic of the image objects, which will be obtained after the "white-balance" correction and the certain color correction for a photo or a video that was fixed underwater at the depth of 10, 15, 20, and 30 meters by means of the certain digital camera when using the claimed illumination device 1, almost does not differ from the spectral characteristics of the image that would be fixed by means of the certain digital camera when illuminating exclusively by the usual "cold white" color illumination device without additional natural ambient daylight illumination (in the course of research works, analogous plots were built for other depths as well: from 0 to 100 meters with a pitch of 5 meters, and the analogous results were obtained). However, when using the claimed illumination device 1 underwater and further "white-balance" correction, the white color objects will become white, the gray color ones will become gray, objects of other colors will also take more natural color rendering, while not only in the direct proximity, but also at a rather great distance from the illumination device 1; water on the image will become (of course, at a certain distance) "transparent" (if it was transparent initially), rather than green-blue colored as when using the usual above-mentioned illumination device (that is not a subject matter of the present invention). That is, when using the claimed illumination device 1 underwater, which emits the light according to the spectrum of the ambient illumination, the "white-balance" correction will automatically correct the color rendering for all of the objects, which were illuminated simultaneously by the illumination device 1 and by the natural daylight illumination underwater, regardless of the distance between these objects and the illumination device 1 that is impossible to achieve when using the usual illumination device underwater (that is not a subject matter of the present invention), in which the emission spectrum is not changed correspondingly depending on the ambient illumination spectrum underwater.

It should be noted that in case of using the respective red, green, and blue color light emitters 3, 4, 5 (of the plurality of light emitters 24) in the illumination device 1, firstly it may appear that it could be sufficient to take the illuminance values for the red, green, and blue components of the ambient illumination received from the RGB-sensor 6 and to emit the light by the red, green, and blue light emitter 3, 4, 5 with the same intensity levels (or proportionally to such levels). However (which is not obvious), if in devices for displaying a colored image (e.g., on a monitor or a TV set) the one uses exactly this method (more precisely, a non-linear correction being a so-called "gamma-correction" is also usually used, but the essence is not changed by this), then, in order to form the composite illumination underwater, this method and different structures for implementation of such a method will be impossible to apply to achieve the posed technical task of the present invention, since each light emitter (of the at least three light emitters of the plurality of light emitters 24) affects not only "its own" color channel of the RGB-sensor 6 (and the corresponding color channel of the photo and/or video camera), but also other ("adjacent") color channels. For example, in case of performing the emission exclusively with the green light emitter 4 with the relative power of 100% (other light emitters are turned off), then in the above-mentioned example the RGB-sensor 6 will obtain the following values within the corresponding color channels: within the red color channel—9.15%, within the green color channel—53.9%, within the blue color channel—19.7%, but at first glance, there was not totally expected that the RGB-sensor 6 will obtain not so much non-zero values as significantly considerable values for the blue and red color channels. Thus, use of the method for forming the composite color that is used in the devices for displaying a colored image will lead to significant errors and inaccuracies of reproduction of the illumination that could meet the posed task of the invention. In order to achieve the maximum accurate result of the posed task, it is necessary either to use the above-mentioned method of finding the required emission power levels of the light emitters or to use such a method and such a structure for implementation of this method, which could account for the influence of each light emitter (of the plurality of light emitters 24) onto all the color channels of the RGB-sensor 6 (and, thus, photo and video camera, which the image is fixed on).

When using more than three light emitters, which have different spectral characteristics of the emitted light, in the plurality of light emitters 24 in the illumination device 1 as one way for finding the required emission power levels for each light emitter, but without limitation thereto, in case of following the above-described method for finding the required relative emission power levels of said light emitters, we will obtain a similar system of three linear equations, but with more than three variables, for which a solution may be found by linear programming methods (e.g., using the known simplex method), if an optimality criterion is given (e.g., in order for the overall power of all more than three light emitters could be minimal to save the electric energy) and if limitations for values of the sought vales are given (e.g., in order for these values could be more than zero).

Therefore, the set of all the essential features of the proposed invention, including its novel essential features, enables achieving the posed technical effect, namely: to create such a portable hand-held illumination device for the underwater photography and/or videography, which could have a structure that, during the underwater photography and/or videography, could enable achieving, from the whole operating portable hand-held illumination device, such an illumination of the environment, objects, and living beings underwater that could be able to change depending on the ambient illumination spectrum and that could differ from the ambient illumination underwater in terms of the spectral characteristic; however, upon reflection from the objects under shooting, it could be perceived by the photomatrix of the digital camera within different color channels with such illuminance levels that the ratio between them coincides or is maximum close to the ratio of the corresponding illuminance levels acquired by the photomatrix of the digital camera from the light of the ambient natural illumination underwater reflected from the same objects under shooting. This results in a possibility of achievement of the maximum close color rendering for the objects, which are located underwater at different distance from the portable hand-held illumination device during photography and/or videography.

At the same time, the set of essential features of the invention also enables achieving, within the illumination spectrum of the environment that is formed underwater from the operating portable hand-held illumination device, such a ratio of mean illuminance levels for the corresponding colors of regions of the visible spectrum being essential for perception by an average person that will not exceed a preset certain value within the structure of the portable hand-held illumination device, thereby enabling creating such an illumination underwater that enables performing photo and video fixation, by photo and video camera, of such images, which store the information about all the colors of regions of the visible spectrum being essential for perception by an average person.

The achievement of the technical effect is enhanced by the fact that in separate embodiments of the structure, the illumination device 1 may be configured such that the plurality of light emitters 24 in the quantity of at least three light emitters 19, 4, 5 comprises three multi-colored light emitters 19, 4, 5, wherein the first light emitter is configured to emit a white color light and is the white light emitter 19, the second light emitter is configured to emit a green color light and is the green light emitter 4, and the third light emitter 5 is configured to emit a blue color light and is the blue light emitter 5. Such solution enables enhancing the achievement of the technical effect almost in all water bodies (both fresh and saline), since the water absorbs the "red" component of the visible spectrum significantly stronger than of the rest of the components of the visible spectrum, and the presence of the white color light emitter 19 enables to provide more uniform spectral characteristic in the reproduced illumination in comparison, e.g., with use of the red color emitter (without use of the white one) together with the green and blue color emitters. Also, the research practice shows that the very presence of the white light emitter 19 is more expedient in the situation, when the natural illumination underwater is totally absent (e.g., at night) or the illuminance from the natural daylight illumination is very weak, e.g., when the underwater photography and/or videography is performed inside a certain object (e.g., inside a sunk ship or in a semi-closed underwater canyon) that significantly impedes entering of the natural daylight into the environment.

Therefore, use of the at least three light emitters 19, 4, 5 within the inventive structure, wherein the white light emitter 19 is present except for the green 4 and the blue 5 emitters, enables achieving a more accurate result of the posed task at a depth underwater and to provide more effective creation (reproduction), at night time, as well as underwater inside objects and buildings, such an illumination that enables to perform the photo and video fixation of images by means of the photo and video camera, which store information about all the colors of the visible spectrum range, which are significant for perception by an average person.

Also, the illumination device 1 may be configured such that the plurality of light emitters 24 in the quantity of at least three light emitters 19, 4, 5 comprises three multi-colored groups of the light emitters, wherein the first group of the light emitters is configured to emit a white color light and is the white group 23 of the emitters that is formed by the white light emitters 19, the second group of the light emitters is configured to emit a green color light and is the green group 21 of the emitters that is formed by the green light emitters 4, and the third group of the light emitters is configured to emit a blue color light and is the blue group 22 of the emitters that is formed by the blue light emitters 5. The quantity of the light emitters mounted in each of the three multi-colored groups 23, 21, 22 may differ depending on technological and ergonomic needs of the illumination device.

The presence of a higher quantity of each of the light emitters 19, 4, 5 in the three multi-colored groups 23, 21, 22 respectively, and the presence of the white group 23 of emitters, provide a possibility of enhancing the illuminance of the illumination created underwater and expanding the range of use of the multi-colored components at moments of creation of the illumination at a depth underwater at night, as well as underwater inside objects and buildings. Generally, this enables performing the photo and video fixation of images underwater by means of the photo and video camera, wherein the images store information about all the colors of the visible spectrum range, which are significant for perception by an average person.

Furthermore, in other separate embodiments of the inventive structure, the illumination device 1 may be configured such that the plurality of light emitters 24 in the quantity of at least three light emitters comprises four multi-colored light emitters 3, 4, 5, 19. And in this case, the first light emitter is configured to emit the red color light and is the red light emitter 3, the second light emitter is configured to emit the green color light and is the green light emitter 4, the third light emitter 5 is configured to emit the blue color light and is the blue light emitter 5, and the fourth light emitter is configured to emit the white color light and is the white light emitter 19. The presence of the red color light emitter 3 enables more accurate reproduction of the illumination that corresponds to the natural illumination during sunrise or sunset at a small depth (up to 3 meters) underwater. Such solution enables achieving a more accurate result of the posed task regardless of a type of the water body and regardless of the existing illuminance from the natural daylight illumination underwater.

Also, in other separate embodiments of the inventive structure, the illumination device 1 may be configured such that the plurality of light emitters 24 in the quantity of at least three light emitters 3, 4, 5, 19 comprises four multi-colored groups of the light emitters being red, green, blue, and white. In such case, the first group of the light emitters is configured to emit the red color light and is the red group 20 of the emitters that is formed by the red light emitters 3, the second group of the light emitters is configured to emit the green color light and is the green group 21 of the emitters that is formed by the green light emitters 4, the third group of the light emitters is configured to emit the blue color light and is the blue group 22 of the emitters that is formed by the blue light emitters 5, and the fourth group of the light emitters is configured to emit the white color light and is the white group 23 of the emitters that is formed by the white light emitters 19. The quantity of the light emitters 3, 4, 5, 19 mounted in each of the four multi-colored groups 20, 21, 22, 23 may differ, depending on technological and ergonomic needs of the illumination device.

The presence of greater quantity of each of the light emitters 3, 4, 5, 19 in the four multi-colored groups 20, 21, 22, 23 respectively, and the presence and the possibility of using the four colors for creation of the illumination underwater, enable enhancing the illuminance of the illumination created underwater and expanding the range of use of the multi-colored components when creating the illumination underwater regardless of a type of the water body and regardless of the existing illuminance from the natural daylight illumination underwater at a depth. Generally, such a solution enables achieving a more accurate result of the posed task regardless of a type of the water body and regardless of the existing illuminance from the natural daylight illumination underwater and to provide more effective photo and video fixation of such images underwater by means of the photo and video camera, which store information about all the colors of the visible spectrum range, which are significant for perception by an average person.

In separate embodiments of the inventive structure, the illumination device further comprises the waterproof display 32 that is connected to the electronic digital system 18. This waterproof display 32 may display such parameters of operation and current status of the illumination device 1 as: a current charge status of the battery 16, an operation mode of the device (if several operation modes of the device are provided), a user menu (if programming of the device or change of the device operation modes by means of the menu is provided), current illuminance levels within each color channel, which are fixed by the RGB-sensor 6, and other necessary information. The waterproof display 32 may be located within its own (separate) waterproof, pressure-retaining housing that is coupled to the illumination device 1 (not shown in the drawings), or the waterproof display 32 may be embedded into the waterproof, pressure-retaining housing 2.

The presence and use of the waterproof display 32 enable the user to perform a continuous visual control of the operation and the current status of the operating portable hand-held illumination device 1 when it creates the illumination underwater at moments of performing the underwater photography and/or videography. Thus, the presence of the display 32 within the proposed illumination device facilitates more effective achievement of the technical effect of the invention.

BRIEF DESCRIPTION OF THE DRAWINGS

Brief description of functional diagrams.

The practical implementation and industrial applicability of the portable hand-held illumination device is explained by schematic drawings of the structure, in which.

Figure 1:
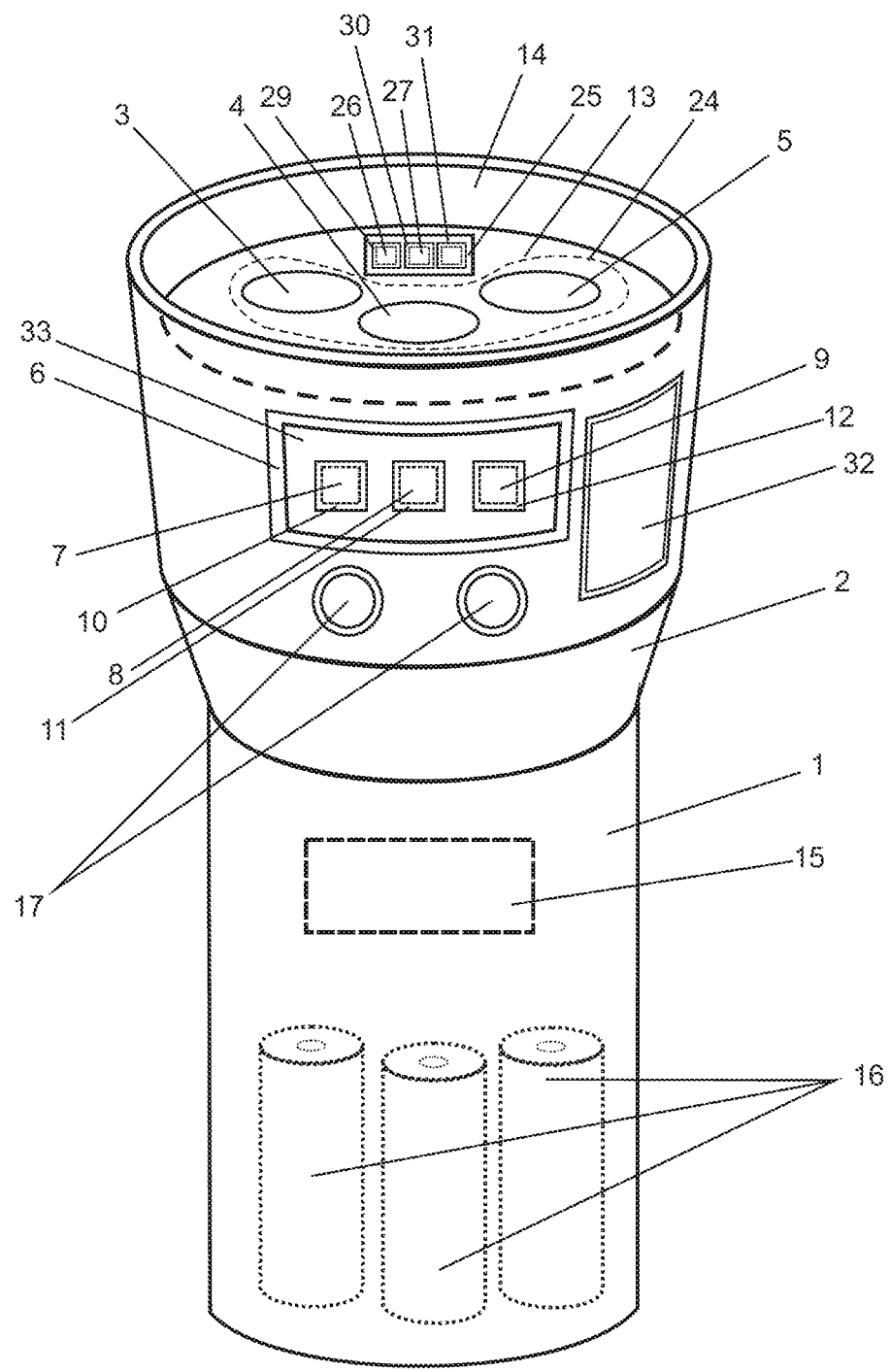
FIG. 1 is the portable hand-held illumination device for the underwater photography and/or videography (with the additional RGB-sensor 25 with the waterproof display 32)

Elements of the inventive structure are denoted with the following numeric positions:

1—the portable hand-held illumination device for the underwater photography and/or videography;
2—the waterproof, pressure-retaining housing of the illumination device;
3—the first light emitter having a certain spectral characteristic (e.g., of the red color);
4—the second light emitter having a certain spectral characteristic (e.g., of the green color) that differs from the spectral characteristic of the emitter 3;
5—the third light emitter having a certain spectral characteristic (e.g., of the blue color) that differs from the spectral characteristics of the emitters 3 and 4;
6—the RGB-sensor;
7, 8, 9—the three illumination intensity level measurement sensors of the RGB-sensor 6;
10—the red colored light filter of the illumination sensor 7;
11—the green colored light filter of the illumination sensor 8;
12—the blue colored light filter of the illumination sensor 9;
13—the operating platform of the portable hand-held illumination device 1, from which the light is emitted;
14—the waterproof, transparent pressure-retaining material of the operating platform 13;
15—the programmed controller;
16—the power element;
17—the operation control elements (on/off switches);
18—the electronic digital system;
19—the additional fourth light emitter that is configured to emit the white light;
20—the red group of the light emitters;
21—the green group of the light emitters;
22—the blue group of the light emitters;
23—the white group of the light emitters;
24—the plurality of light emitters;
25—the additional RGB-sensor for measuring the illumination spectrum from the plurality of light emitters 24;
26, 27, 28—the three illumination intensity level measurement sensors of the additional RGB-sensor 25;
29—the red colored light filter of the illumination sensor 26;
30—the green colored light filter of the illumination sensor 27;
31—the blue colored light filter of the illumination sensor 28;
32—the waterproof display;
33—the waterproof, transparent pressure-retaining material for the RGB-sensor 6.

DETAILED DESCRIPTION OF THE PREFERRED EMBODIMENT

The proposed illumination device is made in the form of the portable hand-held illumination device 1 for the underwater photography and/or videography (FIG. 1-FIG. 4). Generally, the entire inventive structure is made in the form of the device that is: portable and convenient for carrying close at hand and for transporting from place to place; small-sized, space-saving; relatively small and rigid. Size, weight, and dimensions of this device enable it to be immersed underwater (at a certain depth) together with a photographer without special additional appliances.

Figure 2:
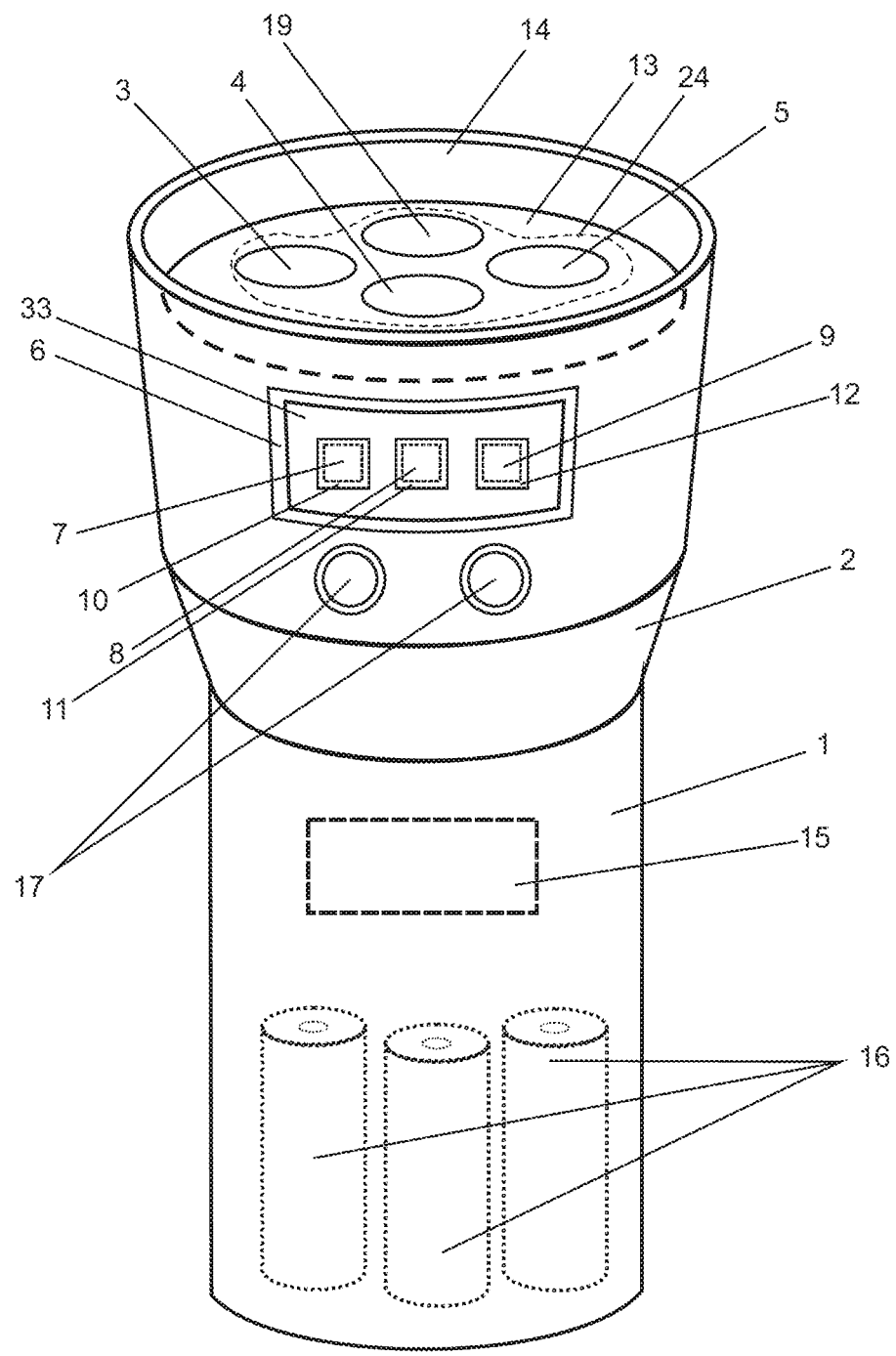
FIG. 2 is the portable hand-held illumination device for the underwater photography and/or videography (with the four light emitters 3, 4, 5, 19 of the plurality of light emitters 24)
Figure 5:
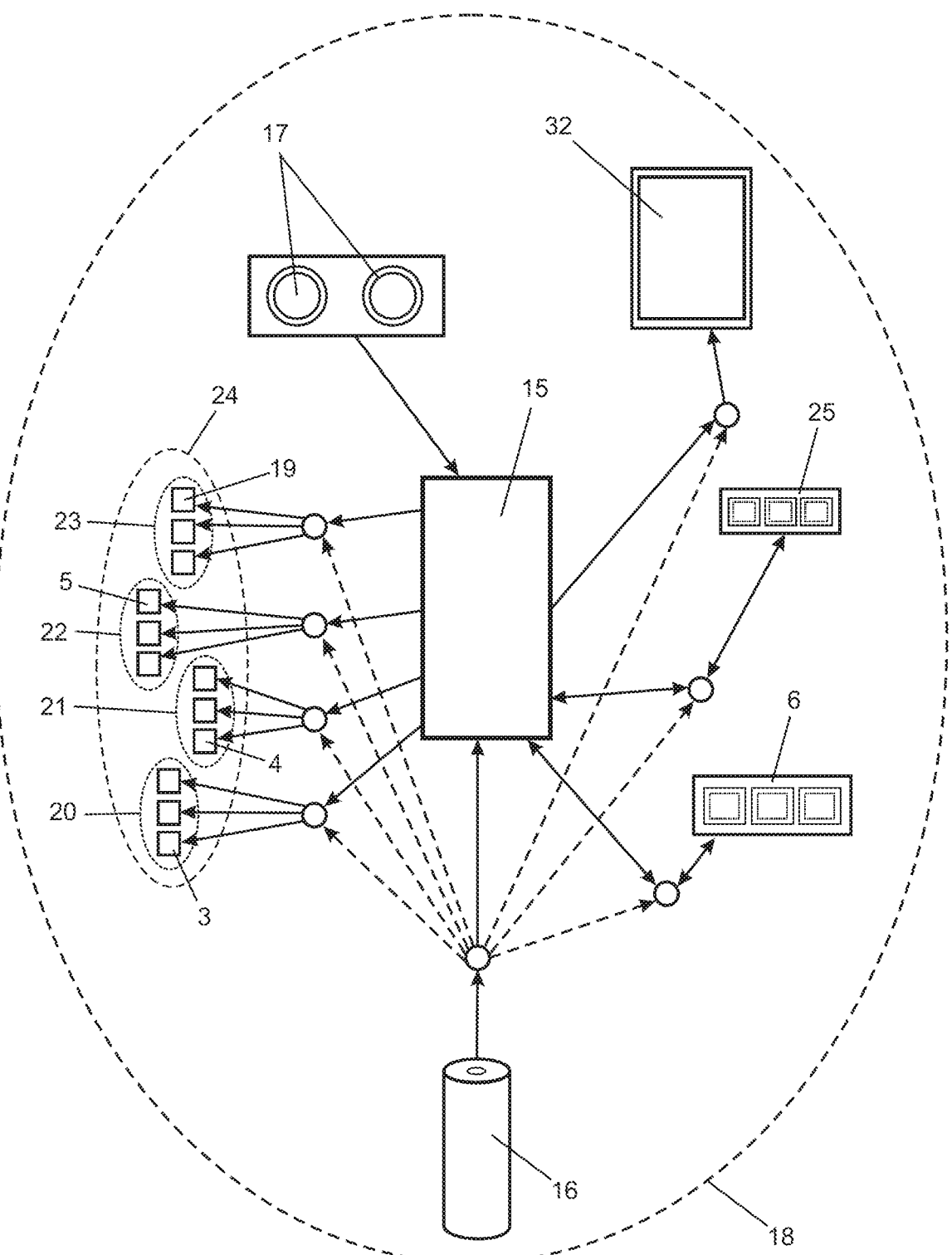
FIG. 5 is the electronic digital system 18.
Figure 6:
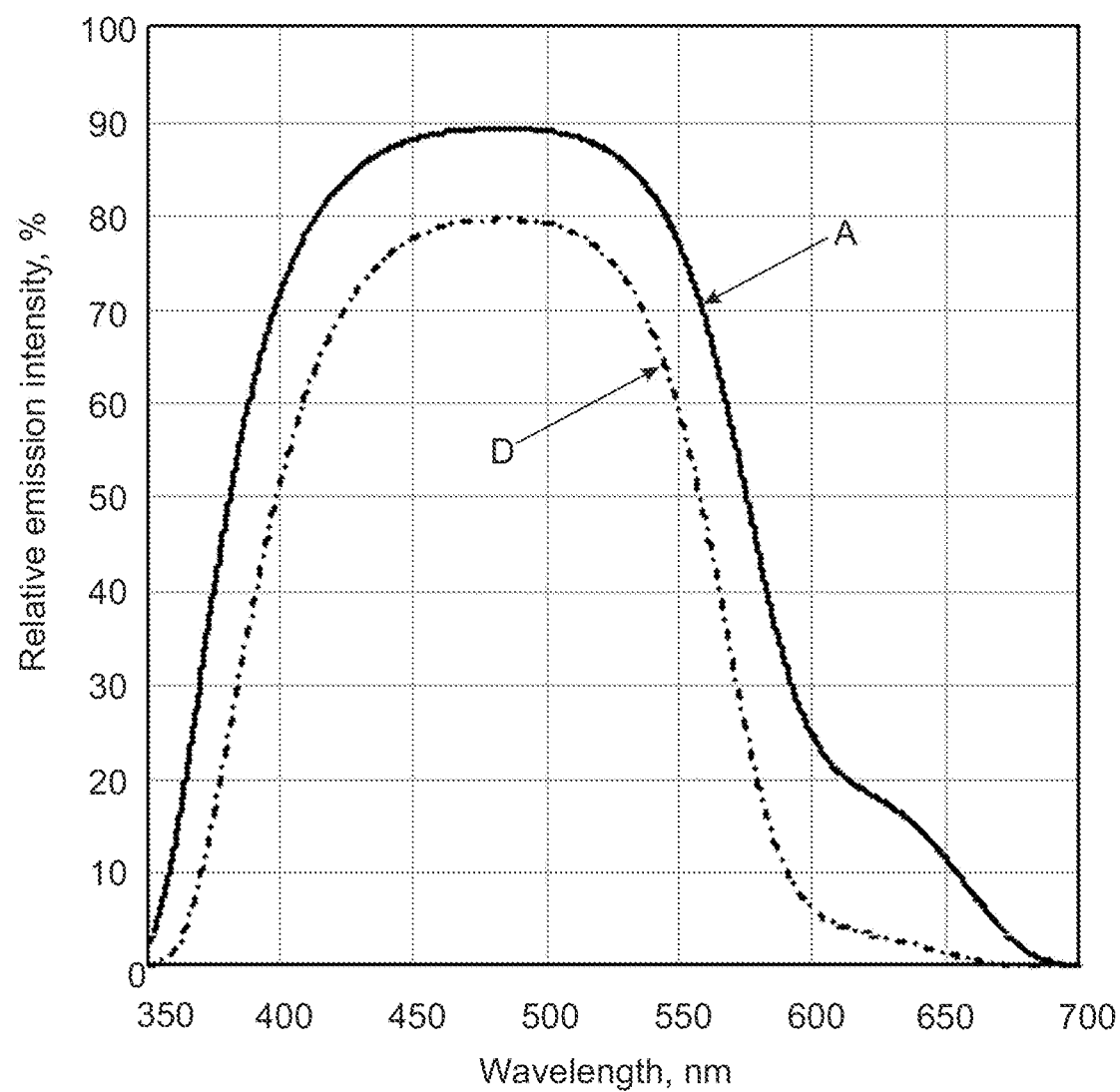
FIG. 6 is the Plot 1.
Figure 7:
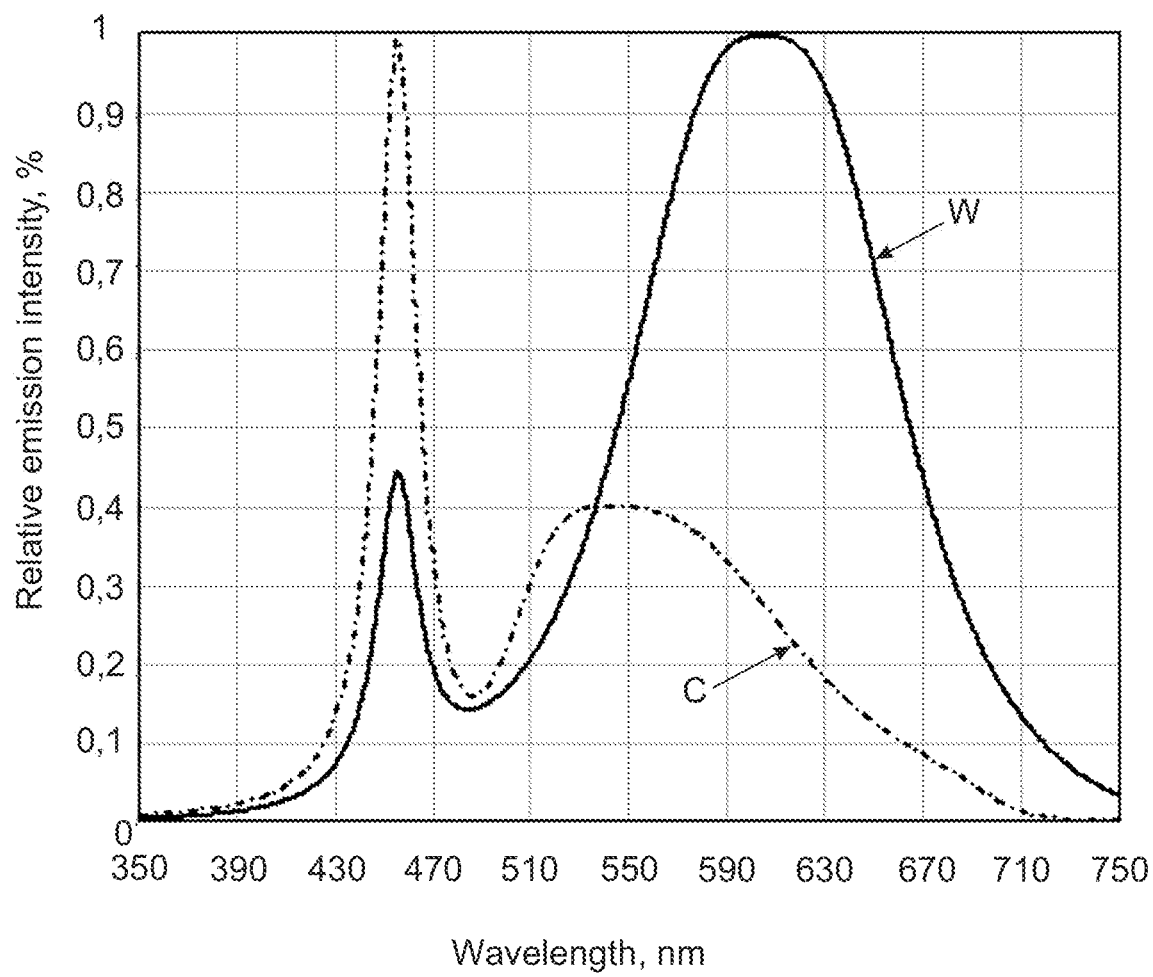
FIG. 7 is the Plot 2.
Figure 8:
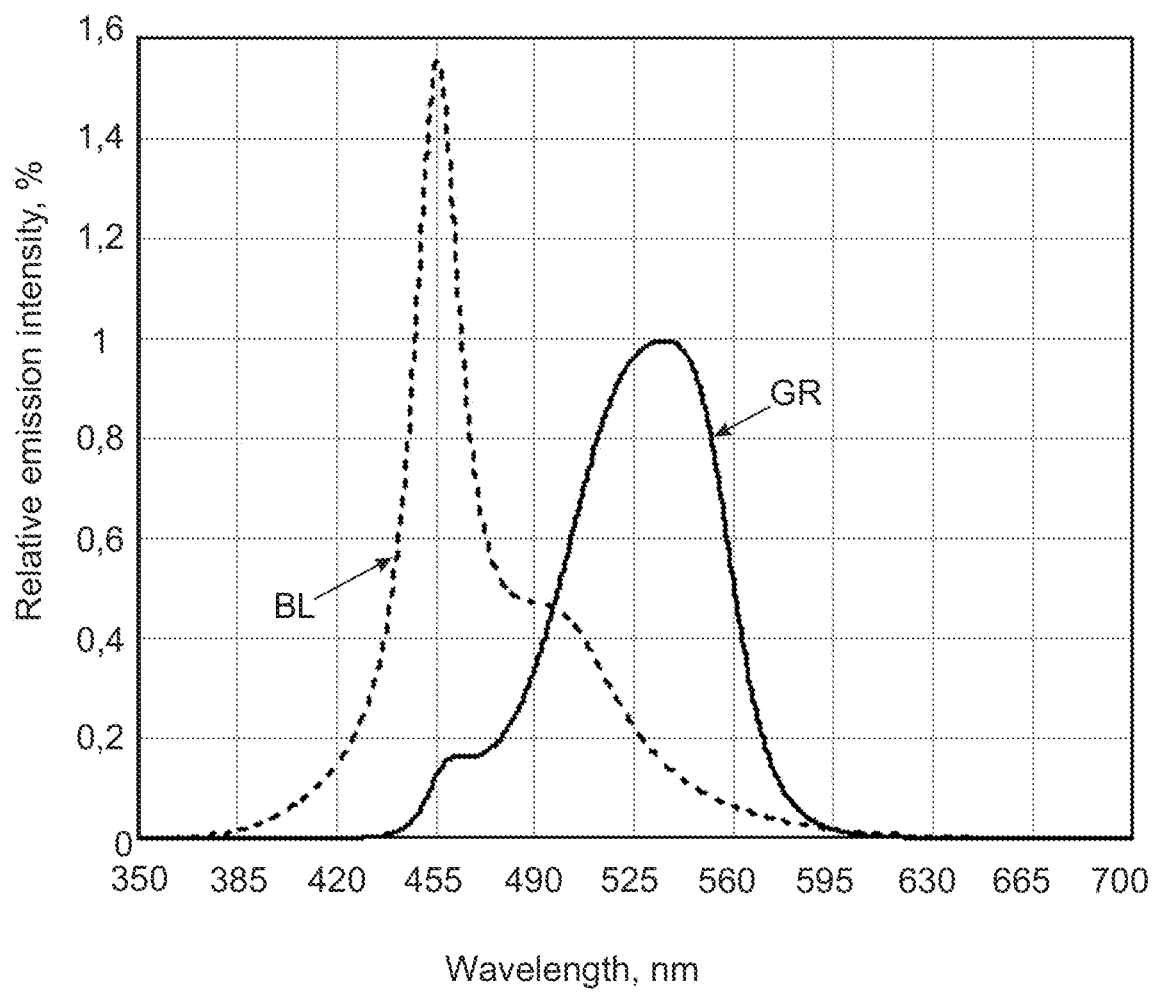
FIG. 8 is the Plot 3.
Figure 9:
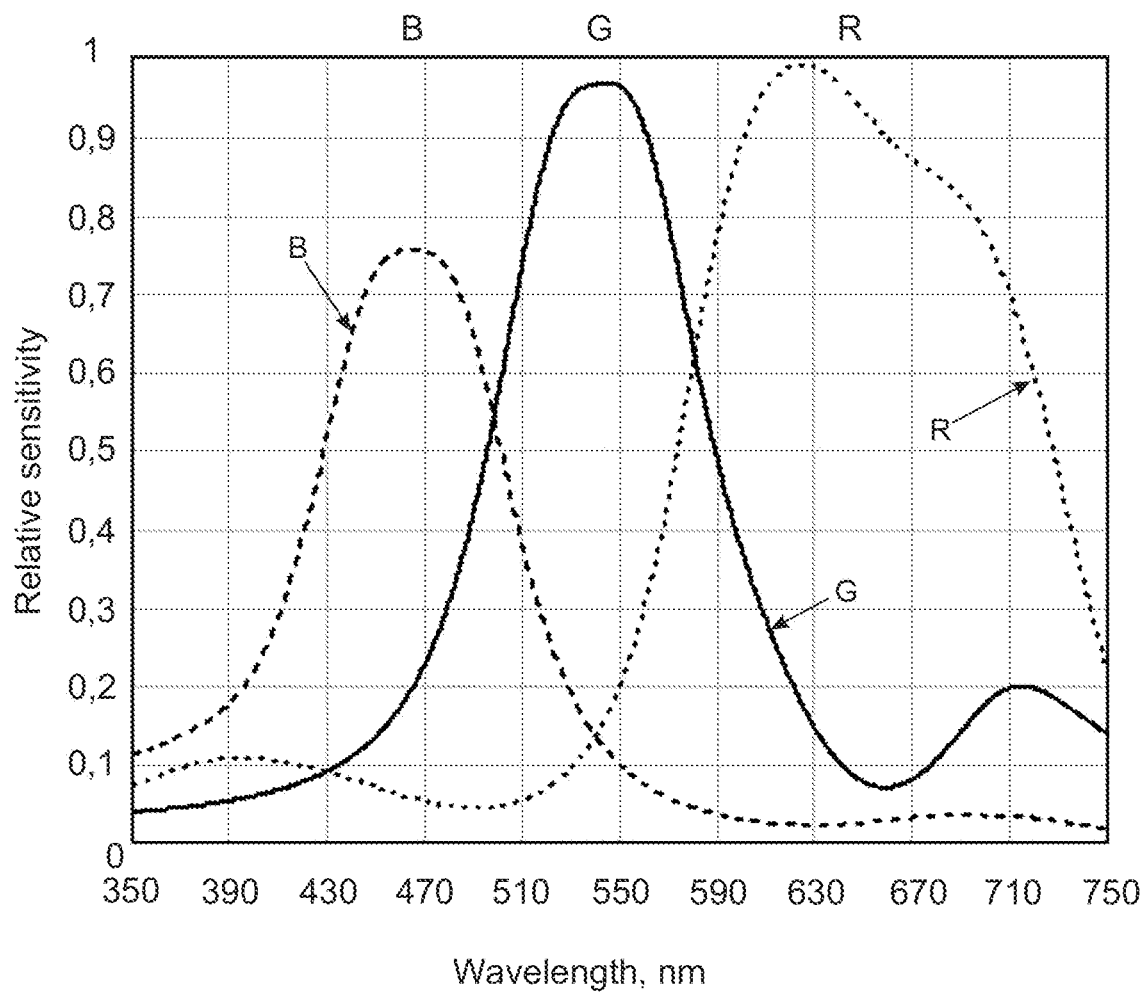
FIG. 9 is the Plot 4.
Figure 10:
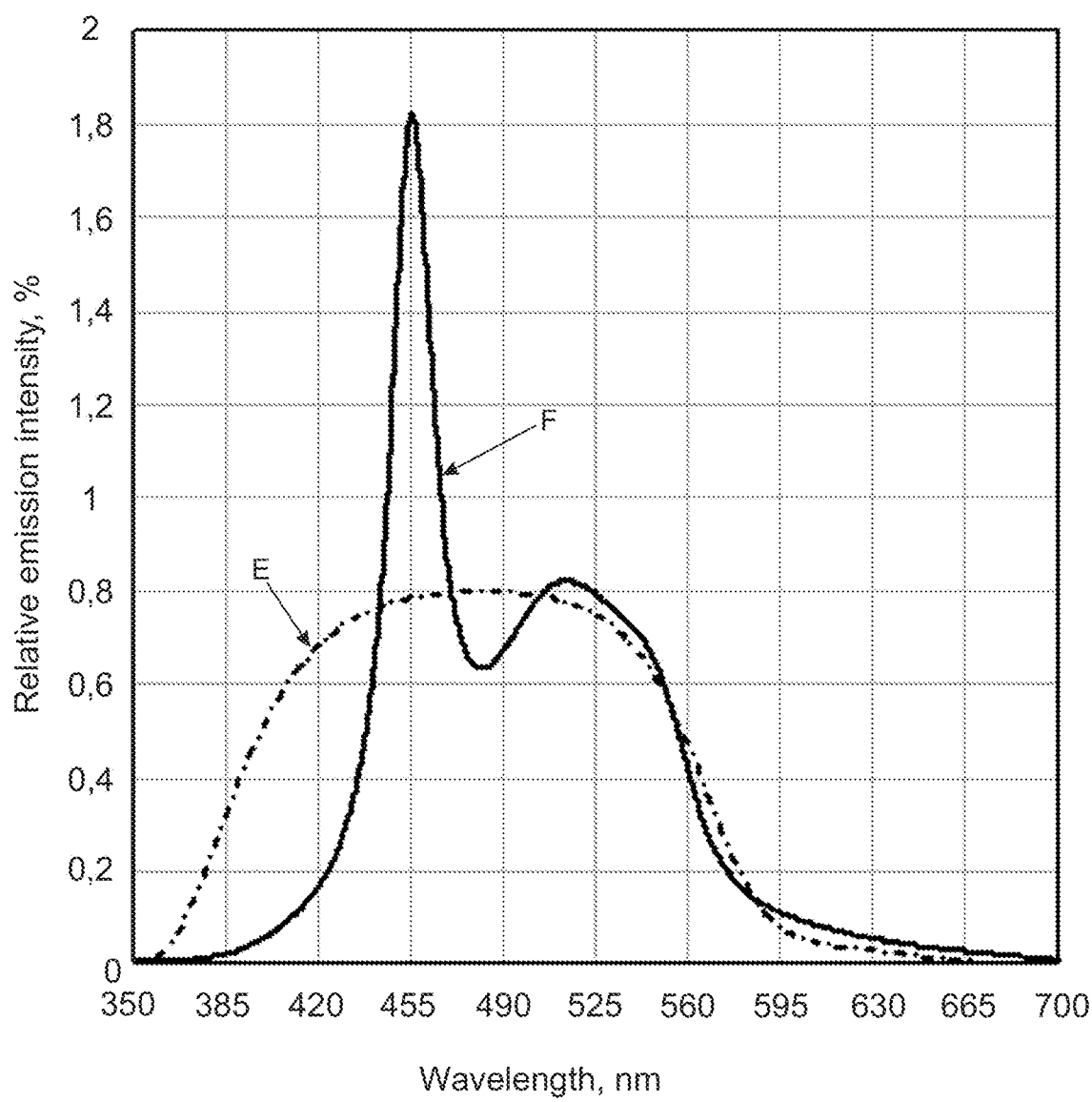
FIG. 10 is the Plot 5.
Figure 11:
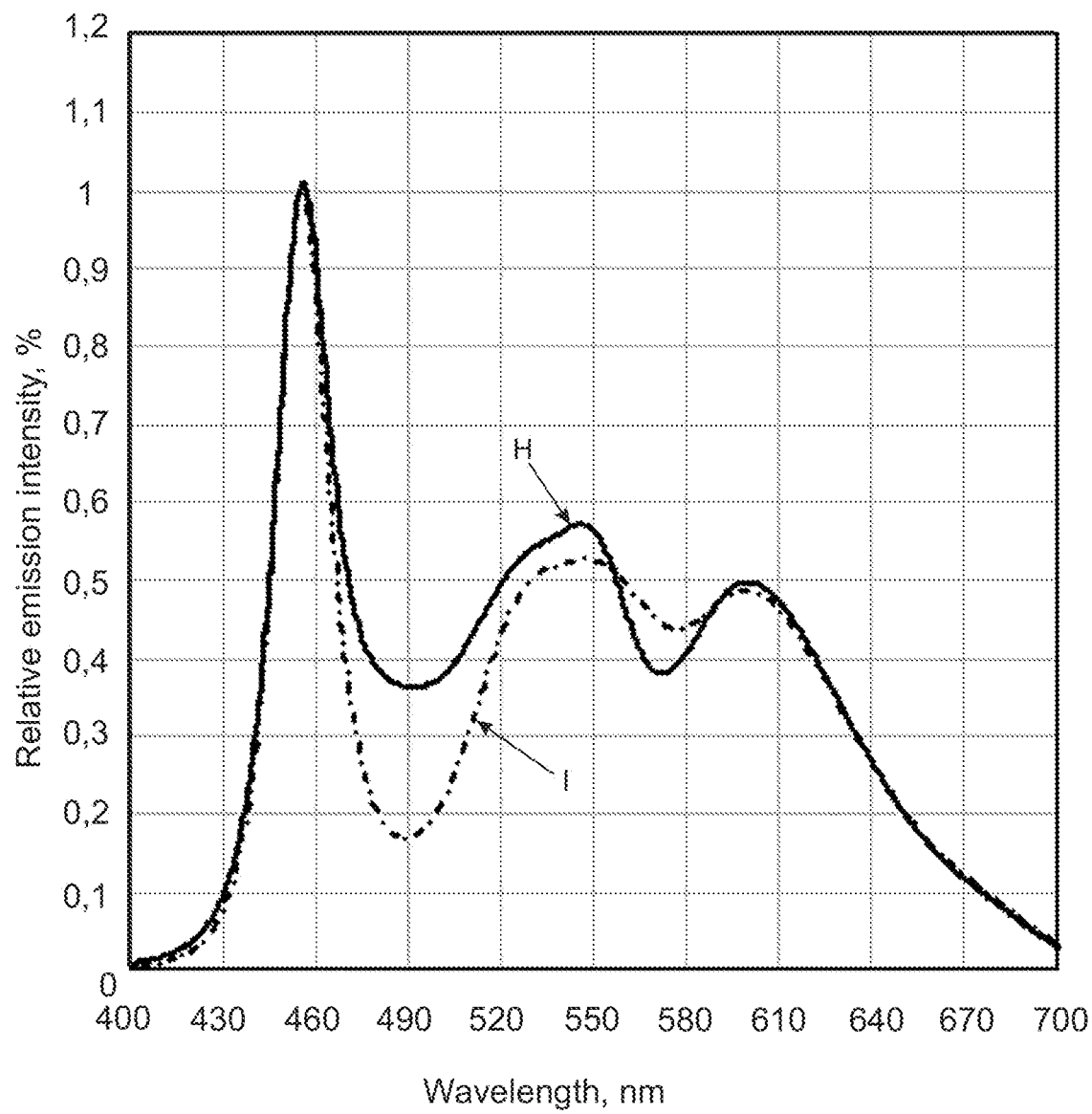
FIG. 11 is the Plot 6.
Figure 12:
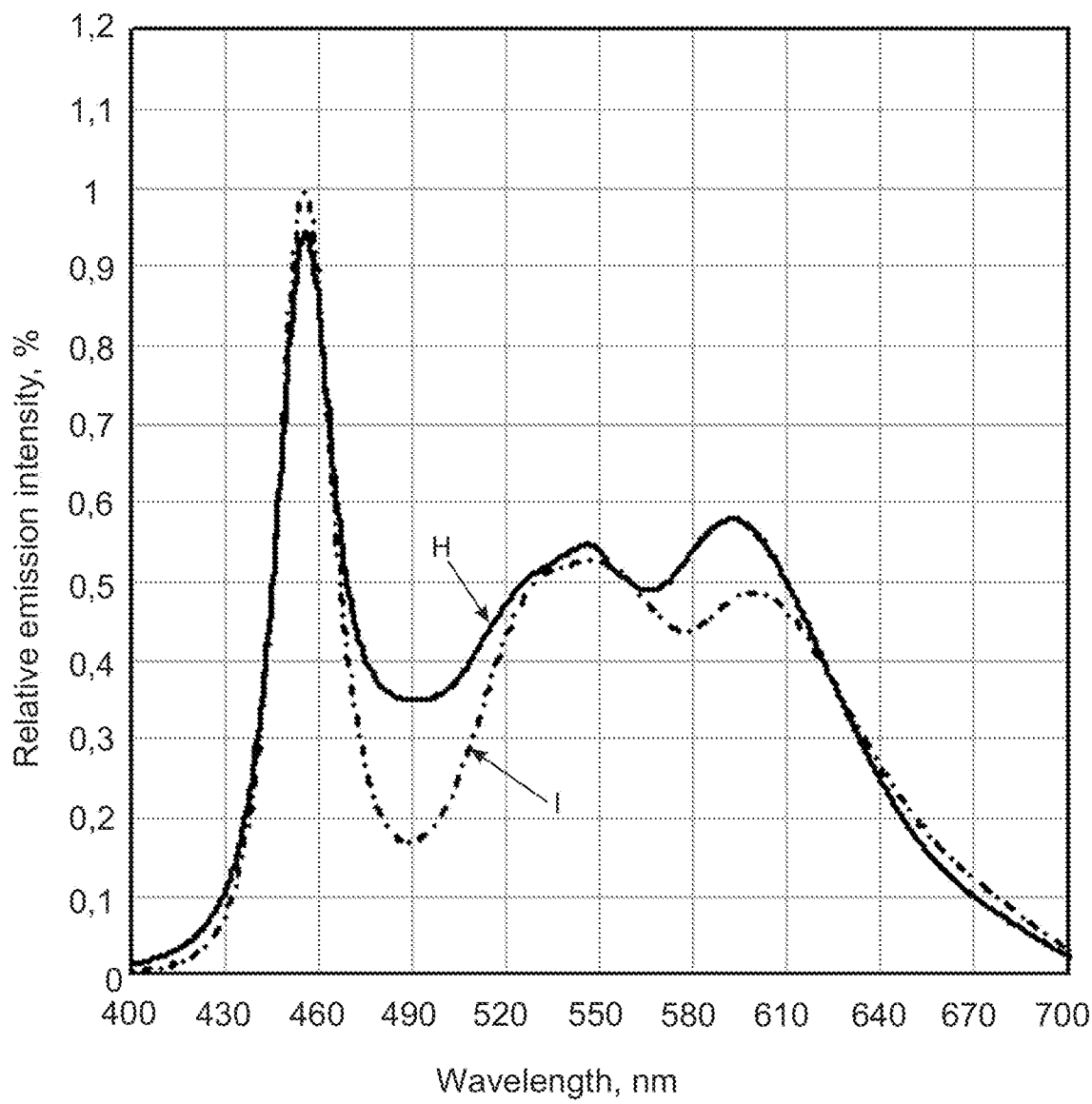
FIG. 12 is the Plot 7.
Figure 13:
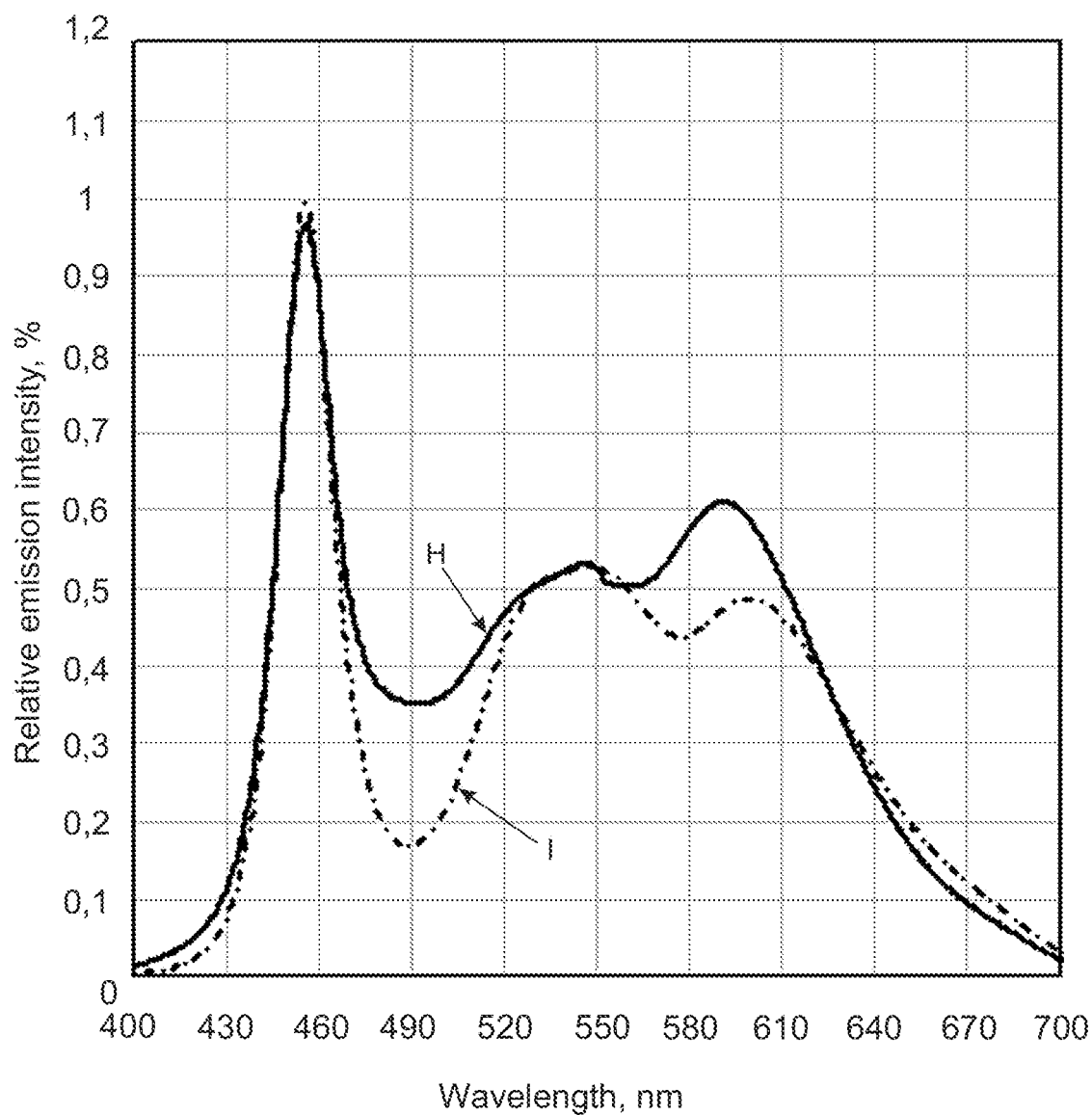
FIG. 13 is the Plot 8.

The main structural elements of the portable hand-held illumination device 1 are: the waterproof, pressure-retaining housing 2; the waterproof, transparent pressure-retaining material 14 that is tightly coupled to the waterproof, pressure-retaining housing 2; the operating platform, from which the light is emitted; at least one power element 16; control elements 17 for controlling the operation of the illumination device 1; the plurality of light emitters 24 comprising at least three light emitters 3, 4, 5 having different spectral characteristics of the emitted light; at least one spectrum measurement device that is made in the form of the RGB-sensor 6, and the programmed controller 15 (FIG. 1, FIG. 2). Therewith, the light emitters of the plurality of light emitters 24, the RGB-sensor 6, the programmed controller 15, the power element 16 and the control elements 17 for controlling the operation of the portable hand-held illumination device 1 are connected to form a single electronic digital system 18 (FIG. 5). That is, the electronic digital system 18 connects the structural elements of the portable hand-held illumination device 1 for the underwater photography and/or videography between each other, and it may further comprise both simple radioelectronic elements (such as transistors, resistors, capacitors etc.) and integrated circuits and finished module solutions, for example: voltage stabilizer, PWM-controllers, current limiters (that may be used to regulate the emission intensity of the light emitters of the plurality of light emitters 24), analog-to-digital converters, and other necessary elements and modules.

In practice, the waterproof, pressure-retaining housing 2 of the illumination device 1 (FIGS. 1-4) may be made of any material or of several materials (e.g., aluminum, stainless steel, titanium, solid plastics, but without limitation thereto) having certain physical characteristics, which, during use of this housing 2, allow immersing the portable hand-held illumination device 1 (with its base of the structure being located within the waterproof, pressure-retaining housing 2) at a rather great depth underwater, e.g., from 5 m to 100 m, but without limitation thereto. The waterproof, pressure-retaining housing 2 is intended to protect the internal pieces and elements of the inventive structure from water penetration and from the pressure that exists at a depth underwater.

At least one power element 16 (FIGS. 1-4), which may be made in the form of an accumulator electric battery, but without limitation thereto, is located inside the waterproof, pressure-retaining housing 2. The power element 16 is intended to supply the electric power to the internal structural elements and pieces of the inventive structure.

The control elements 17 for controlling the operation of the portable hand-held illumination device 1 are also embedded into the structure of the waterproof, pressure-retaining housing 2. Such control elements may be made in the form of one or two, or several, electromechanical on/off switches 17 (FIGS. 1-4), which also have a special waterproof and pressure-retaining protection. These control elements are intended to activate/deactivate, to set and to change the operation modes of the portable hand-held illumination device 1.

The operating platform 13 is a plane from which the light is emitted and on which all the light emitters of the plurality of light emitters 24 are fixed such that the light (or the majority of the light) from these light emitters could pass "outwardly" from the housing 2 to the surrounding underwater space through the waterproof, transparent pressure-retaining material 14 (FIGS. 1-4), which is configured, in turn, to enable the light beams to go through from the light emitters of the plurality of light emitters 24. The operating platform 13 may be made of aluminum or another material that has necessary properties for arranging the light emitters 24, e.g., good thermal conductivity, in order to provide effective elimination of heat from the operating light emitters 24.

Figure 14:
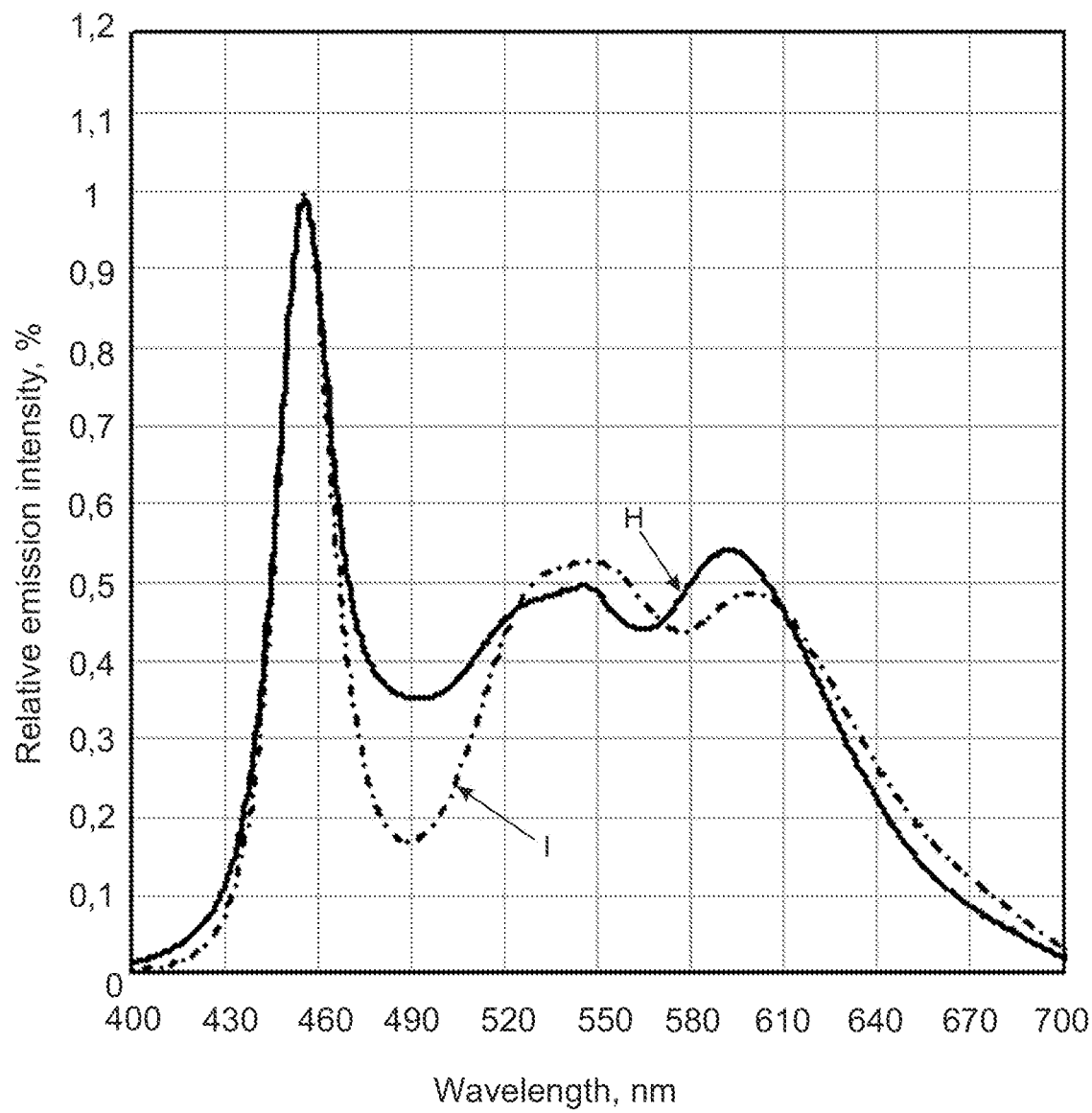
FIG. 14 is the Plot 9.

The waterproof, transparent pressure-retaining material 14 is tightly coupled to the waterproof, pressure-retaining housing 2 such that when the device is located underwater, this coupling protects the portable hand-held illumination device 1 from penetration of the water inside the portable hand-held illumination device 1 (FIG. 14). Therewith, the waterproof, transparent pressure-retaining material 14 is tightly coupled to the waterproof, pressure-retaining housing 2 such that the operating platform 13 of the portable hand-held illumination device 1 (which the light emitters of the plurality of light emitters 24 are located on) could be closed by the waterproof, transparent pressure-retaining material 14 to avoid a possible water penetration on the operating platform 13 and to the light emitters of the plurality of light emitters 24. The waterproof, transparent pressure-retaining material 14 may be made of glass, but without limitation thereto.

The inventive structure comprises the plurality of light emitters 24 that, in turn, comprises at least three light emitters 3, 4, 5 (FIG. 1, FIG. 2), which are mounted inside the waterproof, pressure-retaining housing 2 and are located on the plane of the operating platform 13 of the portable hand-held illumination device 1 (FIG. 1, FIG. 2).

Figure 3:
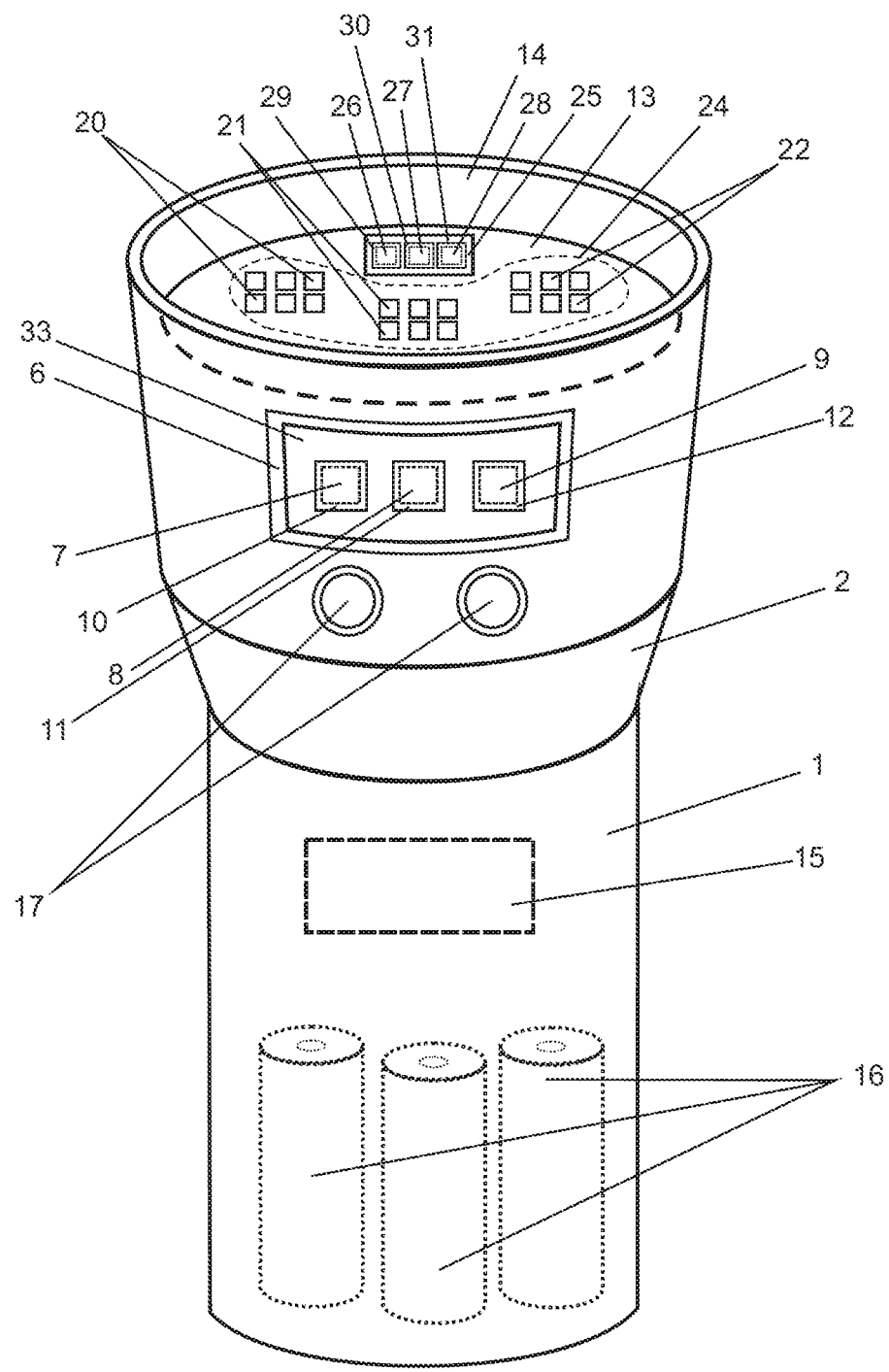
FIG. 3 is the portable hand-held illumination device for the underwater photography and/or videography (with the three groups 20, 21, 22 of the light emitters o the plurality of light emitters 24 and with the additional RGB-sensor 25)

The at least three light emitters 3, 4, 5 (of the plurality of light emitters 24) have different spectral characteristics of the emitted light. For example, in certain separate embodiments, these may be red, green, and blue light emitters, wherein the first light emitter 3 is configured to emit the red color light and is the red light emitter 3, the second light emitter 4 is configured to emit the green color light and is the green light emitter 4, and the third light emitter 5 is configured to emit the blue color light and is the blue light emitter 5. Therewith, in other separate embodiments of the invention, the plurality of light emitters 24 may comprise at least three multi-colored groups of the light emitters (FIG. 3, FIG. 2). For example, these may be: the red group 20 of the emitters that is formed by several (at least two) red light emitters 3, the green group 21 of the emitters that is formed by several (at least two) green light emitters 4, and the blue group 22 of the emitters that is formed by several (at least two) blue light emitters 5.

Also, in other separate embodiments of the invention, when the plurality of light emitters 24 comprises at least three multi-colored light emitters (thus, these multi-colored light emitters have different spectral characteristics of the emitted light), three multi-colored light emitters in the form of the white 19, green 4, and blue 5 light emitters may be mounted within the structure of the device instead of the red 3, green 4, and blue 5 light emitters. Therewith, in other separate embodiments of the invention, the plurality of light emitters 24 also may comprise three groups of the light emitters such as: the white group 23 of the emitters that is formed by several (at least two) white light emitters 19, the green group 21 of the emitters that is formed by several (at least two) green light emitters 4, and the blue group 22 of the emitters that is formed by several (at least two) blue light emitters 5.

Figure 4:
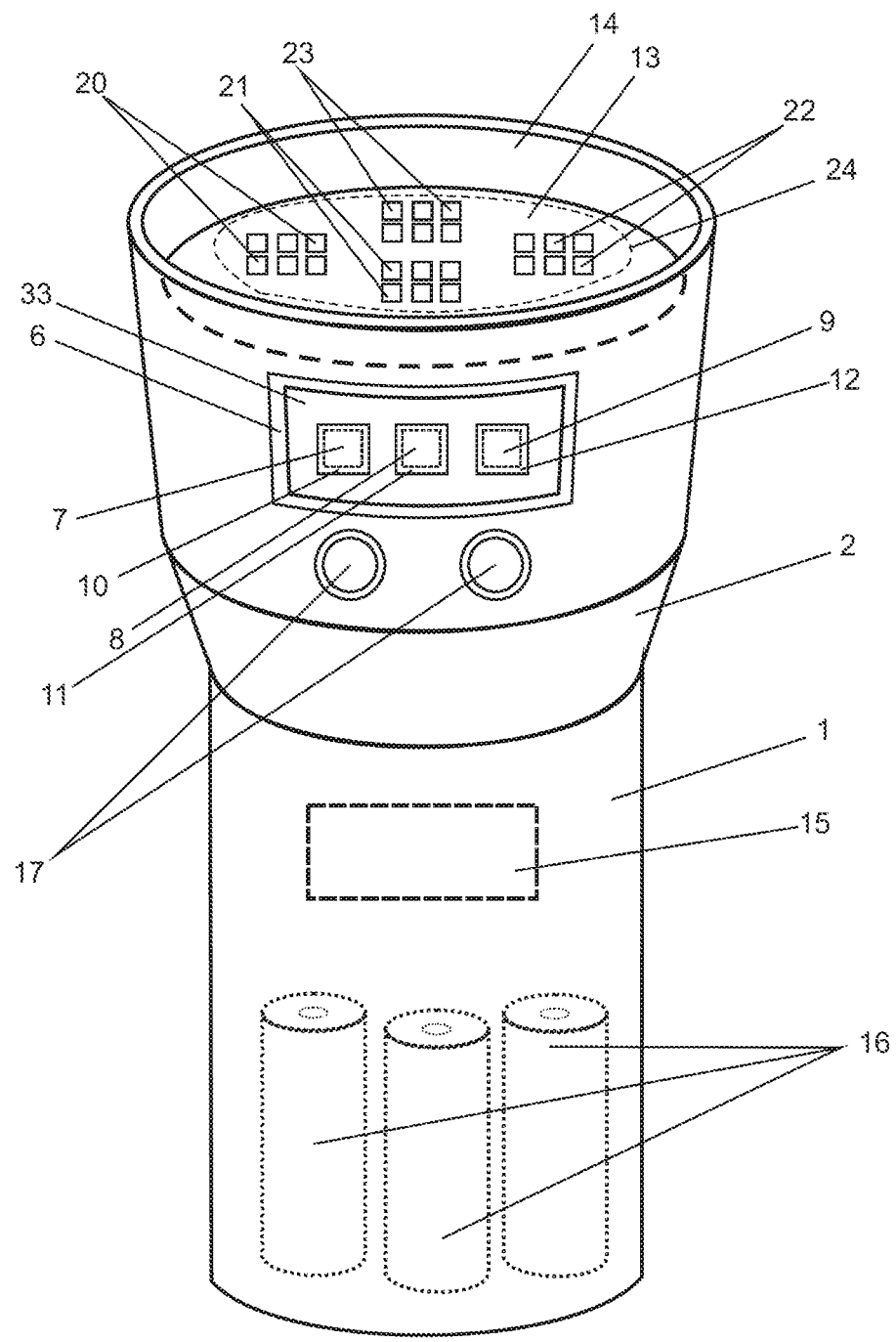
FIG. 4 is the portable hand-held illumination device for the underwater photography and/or videography (with the four groups 20, 21, 22, 23 of the light emitters of the plurality of light emitters 24)

Furthermore, in separate embodiments of the invention, four multi-colored light emitters 3, 4, 5, 19 (FIG. 2) (which are the plurality of light emitters 24) are mounted in the portable hand-held illumination device 1 on the plane of the operating platform 13, wherein the first light emitter is the red light emitter 3, the second light emitter is the green light emitter 4, the third light emitter is the blue light emitter 5, and the fourth light emitter is the white light emitter 19. Thus, each of said four light emitters 3, 4, 5, 19 is configured to emit the light of said corresponding color being red, green, blue, and white. Therewith, in other separate embodiments of the invention, the plurality of light emitters 24 also may comprise four multi-colored groups of the light emitters (FIG. 4). Thus, these may be the red group 20 of the emitters that is formed by several (at least two) red light emitters 3, the green group 21 of the emitters that is formed by several (at least two) green light emitters 4, the blue group 22 of the emitters that is formed by several (at least two) blue light emitters 5, and the white group 23 of the emitters that is formed by several (at least two) white light emitters 19.

In cases, when the plurality of light emitters 24 is formed by three or more multi-colored light emitters (e.g., by the emitters 3, 4, 5, 19) with each of them having a certain color, then these light emitters may be located on the plane of the operating platform 13 in any order and in any manner separately from each other (FIG. 1, FIG. 2), but capable of emitting the light nearly (approximately) in the same direction.

In cases when the plurality of light emitters 24 is formed by three or more multi-colored groups of the light emitters (e.g., by the groups of the emitters being 20—red, 21—green, 22—blue, 23—white), wherein each separate group is formed by (made up of) several (at least two) single-colored light emitters (e.g., by the respective emitters: 3—red, 4—green, 5—blue, 19—white), then each several (at least two) single-colored light emitters (e.g., the red light emitters 3) may be located on the plane of the operating platform 13 both in a consistent manner in the close proximity to each other (FIG. 3, FIG. 4) and in any order and in any manner separately from each other, but capable of emitting the light nearly (approximately) in the same direction.

Therefore, the inventive structure implies that the plurality of light emitters 24 may comprise from at least three separate light emitters (which have different spectral characteristics of the emitted light) to several groups of the light emitters (wherein each group is formed by the emitters having the same spectral characteristics, but the spectral characteristics of the emitters from different groups differ between each other), which are mounted on the plane of the operating platform 13 of the device so as to emit the light nearly (approximately) in the same direction.

The portable hand-held illumination device 1 comprises at least one spectrum measurement device that is configured to obtain information about the optical spectrum of the ambient illumination within said region of the environment, i.e., the ambient illumination spectrum measurement device. Such an illumination spectrum measurement device is made in the form of the RGB-sensor 6 (FIGS. 1-4) (the abbreviation "RGB" means "Red, Green, Blue"). The commonly known technical term "sensor" means a measurement device in the form of a structural combination of one or several measuring converters of a value that is altered and controlled, and the "sensor" produces an output signal that is convenient for remote transmission, storage, and use within control systems, and has normalized metrological characteristics.

The RGB-sensor 6 is formed by at least three illuminance level measurement sensors 7, 8, 9 (FIGS. 1-4), which are configured to obtain information about the optical spectrum of the ambient illumination within the usage environment of the portable hand-held illumination device 1 underwater, e.g., at a depth of from 0.1 m to 200 m, but without limitation thereto.

Any existing modern devices specifically created and intended to measure the illumination level of the ambient illumination may be used as the ambient illuminance level measurement sensors 7, 8, 9. For example, such sensors may be phototransistors or other corresponding optoelectronic elements.

Each of the illuminance level measurement sensors 7, 8, 9 (of the RGB-sensor 6) comprises a separate colored light filter. The "colored light filter" means such structural element/piece that is capable of passing the monochromatic light beams through with a different coefficient (from 0 to 1) depending on the wavelength. Usually, the known technical solutions utilize such colored light filters, which have a light-transmission factor that is close to 1 in any one (or several) regions of the visible spectrum, and that is close to 0 in the rest of the regions of the visible spectrum. The colored light filters 10, 11, 12 comprised in the RGB-sensor 6 may be made, e.g., but without limitation thereto, of the corresponding semi-transparent material that allows the light beams to pass through with the corresponding transmission coefficient depending on the wavelength of the monochromatic component of the light or, e.g., but without limitation thereto, in the form of a dichroic prism, or other optical means.

In particular, the first illuminance level measurement sensor 7 comprises the red colored light filter 10, the second illuminance level measurement sensor 8 comprises the green colored light filter 11, and the third illuminance level measurement sensor 9 comprises the blue colored light filter 12 (FIGS. 1-4). That is, the top of the work external surface of each of the sensors 7, 8, 9 is "covered" by the corresponding colored light filter (10, 11, 12), while these elements and the other necessary electronic elements together, in combination, form the RGB-sensor 6.

The illuminance level measurement sensors 7, 8, 9 together with the colored light filters 10, 11, 12 are mounted together into a single device that is the RGB-sensor 6.

The RGB-sensor 6 in the form of the combination of the three illuminance level measurement sensors 7, 8, 9, together with the corresponding multi-colored light filters 10, 11, 12, is capable of measuring the illuminance levels of the light from the ambient illumination underwater that has passed through the corresponding multi-colored light filters 10, 11, 12. The RGB-sensor 6 produces the output signal or output signals, which is/are convenient for transmission thereof to the programmed controller 15 by means of the electronic digital system 18 (FIG. 5). Such output signal or output signals is/are represented by the information about the illuminance level of the red, green, and blue components of the light that has passed through the corresponding red 10, green 11, and blue 12 colored light filters of the RGB-sensor 6. The RGB-sensor 6 also may comprise other standard technological components and pieces, which are implied by the structure of such measurement device. For example, in some embodiments of the invention, the RGB-sensor 6 may comprise one or several analog-to-digital converters (ADC) and it may "output" the resulting information about the illuminance level within the corresponding color channels in the digital form instantly (e.g., the known RGB-sensor APDS-9960 is made in the form of a finished module that is coupled through the I2C bus and "outputs" data about the optical spectrum in the electronic digital form). In other embodiments, this/these ADC(s) may be comprised in the electronic digital system 18 or integrated into the programmed controller 15, and these ADCs will "pick up" the signal regarding the corresponding illuminance levels (for the red, green, and blue channel) in the analog form from the RGB-sensor 6. In any case, the RGB-sensor 6 may further comprise both simple required radio-electronic elements (such as transistors, resistors, capacitors etc.) and integrated circuits and other modules if they are necessary for the operation and for the interaction of the device with other electronic elements of the structure of the portable hand-held illumination device 1.

Therewith, the RGB-sensor 6 may be located and secured at any location of the waterproof, pressure-retaining housing 2. In various embodiments of the inventive structure, the RGB-sensor 6 may be mounted and secured on the external plane of the waterproof, pressure-retaining housing 2 or in the opening of the waterproof, pressure-retaining housing 2.

In such cases, the external surface of the RGB-sensor 6, particularly, the external surface of the illuminance level measurement sensors 7, 8, 9, together with the corresponding multi-colored light filters 10, 11, 12, is covered at the top with the waterproof, transparent pressure-retaining material 33 (FIGS. 1-4).

In any case, the RGB-sensor 6 is located in such a way that the three illuminance level measurement sensors 7, 8, 9, together with the corresponding multi-colored light filters 10, 11, 12, are physically directed outwardly of the surrounding underwater environment and the natural illumination. Therewith, the RGB-sensor 6 is arranged within the structure of the portable hand-held illumination device 1 such that its structural elements in the number of at least three illumination intensity level measurement sensors 7, 8, 9, together with the corresponding multi-colored light filters 10, 11, 12, are able to perceive the light from the ambient illumination and to provide, by means of the electronic digital system 18, the information about the illuminance level of red, green, and blue components of the light passed through the corresponding red 10, green 11, and blue 12 light filters of the RGB-sensor 6 to the programmed controller 15 for further measuring the emission power levels of the light emitters of the plurality of light emitters 24. Depending on types and formats of the constituent structural elements of the RGB-sensor 6, the information about illuminance levels of the light components may be collected from the RGB-sensor 6 both in the analog and in the electronic digital form, however, in the programmed controller 15, this information about illuminance levels of the light components is stored and processed in the electronic digital form.

It should be also noted that the inventive structure implies that, simultaneously with the above-mentioned, the RGB-sensor 6 is located within the structure of the portable hand-held illumination device 1 in such a way that its structural elements, in particular, the at least three illumination intensity level measurement sensors 7, 8, 9 together with the corresponding multi-colored light filters 10, 11, 12 do not perceive (or almost do not perceive) the light from the illumination that is reproduced by the light emitters of the plurality of light emitters 24 at least at time points, when the information about the optical spectrum of the ambient illumination is "picked up" by the RGB-sensor 6.

The structure of the portable hand-held illumination device 1 for the underwater photography and/or videography implies that it comprises the control means for altering the emission of the light emitters on the basis of the obtained information about the optical range. In the proposed invention, the programmed controller 15 is used as the control means for altering the emission by the plurality of light emitters 24 in the quantity of at least three light emitters 3, 4, 5 (FIGS. 1-5). The programmed controller 15 in the present invention represents a control device in electronics and measurement technology that is adapted to execute logic and arithmetic operations and comprises a non-volatile and random access memory (RAM). In particular, the programmed controller 15 is a control device that is used for automation of technological processes for controlling the light emitters of the plurality of light emitters 24.

Furthermore, the programmed controller 15 is also a device that obtains (picks up) and processes the information from the at least one RGB-sensor 6 that comes to the programmed controller 15 from the RGB-sensor 6 through the electronic digital system 18 in the electronic digital or analog form, and such information is processed by the programmed controller 15 according to a preset program algorithm. Also (as mentioned above), the programmed controller 15 is a control means for altering the emission of the light emitters of the plurality of light emitters 24 that occurs due to the fact that the programmed controller 15 (upon receipt and processing of the information from the RGB-sensor 6) transmits the control signals to the electronic digital system 18 that, in turn, is set to alter the emission power levels of the light emitters of the plurality of light emitters 24.

That is, substantially and directly, the programmed controller 15 receives ("picks up") the information from the RGB-sensor 6, processes this information, and sends control signals, which are intended for certain light emitters of the plurality of light emitters 24, but all these actions of the programmed controller 15 regarding obtaining (collection) of the information/signals and transmission of the information/signals to the light emitters are performed through and by means of commutation and other elements of the electronic digital system 18 (FIG. 5), including by means of the at least one power element 16 (being a source of energy).

The programmed controller 15 is mounted and located inside the waterproof, pressure-retaining housing 2 (FIGS. 1-4).

In order for the claimed device to operate, the inventive structure implies that each light emitter or group of the light emitters of the plurality of light emitters 24 is configured to be controlled by the programmed controller 15 to control the intensity level of the light emitted by them of from 0 to 100% regardless of the light emission intensity level of other light emitters and other groups of the light emitters of this plurality of the light emitters 24. That is, for example, each of the at least three light emitters 3, 4, 5 of the plurality of light emitters 24, due to the independent coupling to the electronic digital system 18 (FIG. 5) and due to the operation of the programmed controller 15 comprised in the electronic digital system 18, is capable of emitting the light having the power level of from 0 to 100% regardless of the light emission power (intensity) level of other light emitters and groups of the light emitters of the plurality of light emitters 24, e.g., but without limitation thereto, by means of using the PWM-modulation.

In some embodiments of the invention, for example, if the plurality of light emitters 24 comprises at least one group of the light emitters and other light emitters or groups of the light emitters, then the light emitters, which belong to a single group, may be coupled in parallel and, thus, these emitters of the single group will alter the intensity of the light that is emitted synchronously (simultaneously). This parallel arrangement of the light emitters of the single group has certain advantages, which at least lie in a more simplified control of these light emitters.

In other embodiments of the invention, if, for example, the plurality of light emitters 24 is formed by three or more multi-colored groups of the light emitters (e.g., by the groups 20, 21, 22, 23), all light emitters of the plurality of light emitters 24 (e.g., the light emitters 3, 4, 5, 19) are coupled to the electronic digital system 18 independently (FIG. 5) and, thus, they may emit the light with a different intensity regardless of the emission intensity of the light emitters both from this group and from other groups. "Combined" variants (of independent and parallel) coupling of the light emitters of each group of the light emitters to the electronic digital system 18 are also possible, when, for example, the plurality of light emitters 24 is formed by three or more multi-colored groups of the light emitters.

The inventive concept implies that the at least three light emitters 3, 4, 5 having different spectral characteristics of the light being emitter (of the plurality of light emitters 24) are configured to emit the light having such different spectral characteristics, which provide reproduction of any color within the RGB color space, with an accuracy that is predetermined within the program algorithm of the programmed controller 15, the color being corresponding to the color that is fixed by the RGB-sensor 6 within the range of the ambient illumination in the usage environment of the portable hand-held illumination device 1 underwater.

That is, the possibility of altering the emission intensity level of each separate light emitter and "mixing" (blending) their color (and if the plurality of light emitters 24, wherein the light emitters are preliminary selected with the spectral characteristics being necessary for the usage at the step of designing, manufacturing, and setting the device), enables to reproduce any color within the RGB color space corresponding to the color that is fixed by the RGB-sensor 6 within the ambient illumination range in the usage environment of the portable hand-held illumination device 1 underwater.

In separate embodiments of the invention, the portable hand-held illumination device 1 for the underwater photography and videography, besides the main (at least one) RGB-sensor 6, may further comprise at least one additional RGB-sensor 25 (FIG. 1, FIG. 3) that is formed by at least three illuminance level measurement sensors 26, 27, 28, which are configured to obtain information about the optical spectrum of the illumination that is reproduced by the light emitters of the plurality of light emitters 24. Each of these illuminance level measurement sensors 26, 27, 28 comprises a separate colored light filter, in particular, the first illuminance level measurement sensor 26 comprises a red colored light filter 10, the second illuminance level measurement sensor 27 comprises a green colored light filter 30, and the third illuminance level measurement sensor 28 comprises a blue colored light filter 31.

Generally, the structure of the additional RGB-sensor 25 may be identical to the structure of the main RGB-sensor 6. The additional RGB-sensor 25 may be mounted within the structure of the portable hand-held illumination device 1 on the operating platform 13 (FIG. 1, FIG. 3) or at any location inside the waterproof, pressure-retaining housing 2 in such a way so that the illuminance levels measurement sensors 26, 27, 28 could perceive the light from the light emitters (such as 3, 4, 5, 19) of the plurality of light emitters 24, but almost could not perceive (or perceive minimally) the light from the ambient illumination underwater. The additional RGB-sensor 25 is coupled so as to form the single electronic digital system 18 to other described elements of this system 18 (FIG. 5).

The structure of the portable hand-held illumination device 1 for the underwater photography and videography enables to mount the waterproof display 32 (FIG. 1) that is connected to the electronic digital system 18 (FIG. 5). The display 32 may display operation parameters and the current status of the illumination device 1. The waterproof display 32 may be located within its own waterproof, pressure-retaining housing (that is coupled to the illumination device 1), or the waterproof display 32 may be embedded into the waterproof, pressure-retaining housing 2.

The structure of the portable hand-held illumination device 1 also may comprise various sealing pieces and means, which are intended to seal the connections of the product and to avoid water penetration inside the portable hand-held illumination device 1.

THE BEST EMBODIMENT OF THE INVENTION

Description of the operation of the portable hand-held illumination device for the underwater photography and/or videography.

The portable hand-held illumination device 1 is intended to be used during the underwater photography and/or videography performed underwater by means of a digital photo and video camera or other similar devices, which are intended for photography and videography. It is fully possible to use an analog (not digital) film photo and video camera as well together with the illumination device 1, since both analog and digital photo and video cameras utilize an identical (but implemented differently) mechanism for fixation of a colored image, namely, a color division into several (usually into three: red, green, and blue one) components, and, in fact, the colored image is fixed in the form of three monochromic images. And in spite of the fact that additional conversions of these three monochromic image components occur in the digital cameras, it does not make an influence onto a final result and onto a possibility of using both analog film and modern digital photo and video cameras together with the illumination device 1.

Thus, before performing the underwater photography and/or videography, in order to create and to achieve a certain illumination of an environmental area at a depth underwater, firstly, the portable hand-held illumination device 1 is turned on and used.

The portable hand-held illumination device 1 for the underwater photography and/or videography operates as follows.

The illumination device 1 is turned on by means of the control elements 17 (this may be performed both underwater and before an operator with the device 1 submerges into the water).

The control elements 17 for controlling the operation of the portable hand-held illumination device 1 may be made in the form of buttons, on/off switches, which help to activate the power element 16 in the electronic digital system 18 that, in turn, "distributes" the power to all other electronic elements of the illumination device 1.

At the beginning of the operation of the illumination device 1, all light emitters of the plurality of light emitters 24 are turned off (not active).

Therewith, the RGB-sensor 6 in the form of the combination of the three illuminance level measurement sensors 7, 8, 9 together with the corresponding multi-colored light filters 10, 11, 12 performs measurements of the illuminance levels of the light from the ambient illumination underwater that has passed through the corresponding multi-colored light filters 10, 11, 12 continuously in an automatic mode or upon receipt of a certain control signal from the programmed controller 15 by means of the electronic digital system 18. The RGB-sensor 6 is located in such a way that the three illuminance level measurement sensors 7, 8, 9 together with the corresponding multi-colored light filters 10, 11, 12 are physically directed outwardly of the surrounding underwater environment and the natural illumination, and, thus, the RGB-sensor 6 perceives the light from the ambient illumination underwater.

During operation of the illumination device 1, the RGB-sensor 6, continuously in an automatic mode (or upon receipt of a certain control signal from the programmed controller 15 by means of the electronic digital system 18), produces an output signal (or output signals), which is/are convenient for providing to the programmed controller 15 by means of the electronic digital system 18. Such output signal or output signals is/are represented by the information about the illuminance level of the red, green, and blue components of the light that has passed through the corresponding red 10, green 11, and blue 12 colored light filters of the RGB-sensor 6. The output signal or output signals may be produced in the analog or in the electronic digital form (depending on specific internal structural details of the RGB-sensor 6).

The output signal or output signals produced by the RGB-sensor 6 is/are "picked up" by the programmed controller 15 by means of the electronic digital system 18. Then, due to the operation of a predetermined program algorithm, the programmed controller 15 transmits the control signals to the electronic digital system 18 that, in turn, is set to alter the emission power levels of the at least three light emitters (e.g., of red 3, green 4, and blue 5, or white 19, green 4, and blue 5) of the plurality of light emitters 24.

That is, a loop of receiving-providing-transmitting the signals for altering the emission power levels of the at least three light emitters of the plurality of light emitters 24 is as follows:

the light from the environmental area gets to the multi-colored light filters 10, 11, 12 and then to the three illuminance level measurement sensors 7, 8, 9 of the RGB-sensor 6;

"at the initiative of" the programmed controller 15 (or, in some embodiments, "at the initiative" of the RGB-sensor 6), the electronic digital system 18 "picks up" the output signal from the RGB-sensor 6 and directs the same to the programmed controller 15;

the programmed controller 15 "processes" the signal (information) received from the RGB-sensor 6, afterwards it generates and directs another (control) signal (or signals) with the information about power levels of the operation of the emitters of the plurality of light emitters 24 to the electronic digital system 18;

the electronic digital system 18 supplies power from the battery 16 to the light emitters of the plurality of light emitters 24 in a certain "adjustable" manner, wherein such power "adjustment" occurs independently for each light emitter (or group of the light emitters) that differs from other light emitters in terms of the spectral characteristics of the emitted light; this results in formation of the illumination from the light emitters of the plurality of light emitters 24 into the environmental area underwater, wherein each light emitter of the at least three light emitters 3, 4, 5 emits the light with the power level (of from 0 to 100%) according to data received from the programmed controller 15.

In some technical embodiments of the invention, such "adjustment" of the power that is supplied to each separate light emitter or to each separate group of the light emitters of the plurality of light emitters 24 (and, as a result, the adjustment of the emission power of the corresponding light emitters) may occur, e.g., but without limitation thereto, by changing the voltage or by changing the magnitude of the flowing current that is supplied/flowed to/through the corresponding light emitter or group of the light emitters of the plurality of light emitters 24. In other embodiments of the invention, the PWM-modulation or another method or means for correcting the emission power of the light emitters may be used instead of changing the voltage or magnitude of the flowing current.

During the operation of the device 1, each light emitter or each group of light emitters of the plurality of light emitters 24, under the control of the programmed controller 15, emits the light with the intensity level of from 0 to 100% regardless of the light emission intensity level of other light emitters and other groups of the light emitters of this plurality of the light emitters 24. The at least three emitters 3, 4, 5 of the plurality of light emitters 24 have different spectral characteristics of the emitted light, and during the operation of the device 1 they emit the light of such different spectral characteristics that allow these at least three light emitters 3, 4, 5, by means of the set of these at least three light emitters 3, 4, 5 under the corresponding emission intensity level (that is "set" by the programmed controller 15) of each separate light emitter or each separate group of the light emitters, to reproduce, with accuracy that is predetermined within the program algorithm of the programmed controller 15, any color within the RGB color space that corresponds to the color that is fixed by the RGB-sensor 6 within the ambient illumination range in the usage environment of the portable hand-held illumination device 1 underwater.

That is, each light emitter, e.g., 3, 4, 5, or the group of these light emitters of the plurality of light emitters 24 operate (emit the light of different intensity) independently of each other. For example, if the plurality of light emitters 24 comprises three groups of the light emitters, wherein the first group is formed (e.g.) by four red light emitters, the second group is formed by four green light emitters, and the third group is formed by four blue light emitters, then, according to the control signals of the programmed controller 15, all four red light emitters may emit light having the intensity of (e.g.) 20%, all four green light emitters may emit light having the intensity of (e.g.) 60%, and all four blue light emitters may emit light having the intensity of (e.g.) 100% (the above-mentioned emission intensity levels of the red, green, and blue light emitters correspond to operation of the illumination device 1 underwater according to the spectrum of the ambient illumination at the depth of about 5 meters within a certain water body). Furthermore, in separate embodiments of the invention, the light emitters of a single group (e.g., of the group of the red light emitters) may be configured to control the emission power independently, i.e., each separate light emitter of a single group may emit light (according to the control signals of the programed controller 15) independently and with a different intensity relative to other light emitters of this group.

In any case, the structure of the portable hand-held illumination device 1 is made such that separate groups of the light emitters of the plurality of light emitters 24 (e.g., the group of red 20, the group of green 21, and the group of blue 22 light emitters) are capable of operating (emitting the light) independently of each other as dependent on the control signals of the programmed controller 15 and due to the corresponding operation of the electronic digital system 18 that alters the emission power levels of the light emitters of the plurality of light emitters 24.

Therefore, the original structure and the location of the RGB-sensor 6 within the device 1, its capability of perceiving the ambient illumination and to produce output signals (in the form of the required information about the spectrum of the ambient illumination in the analog or in the electronic digital form), which are "picked up" by the programmed controller 15 and then (after processing by the program algorithm) transmitted to the electronic digital system 18, which, in turn, alters the emission power levels of the light emitters of the plurality of light emitters 24, allow achieving, in real time, such an illumination of the environment, objects, and living beings underwater that is able to change depending on the ambient illumination spectrum due to said operation of the device 1.

In various embodiments of the invention, various operation modes of the illumination device 1 and various algorithms for altering the power of the light emitters of the plurality of light emitters 24 according to the spectrum of the ambient illumination underwater may be implemented. For example, separate embodiments of the invention may imply a mode of "not altering the spectrum of the emitted light according to the spectrum of the ambient natural illumination" or a mode of "freezing the spectrum", i.e., upon receipt of the corresponding command from the user (by means of the control means 17), the illumination device 1 will emit the light according to the last measurement of the spectrum of the ambient natural illumination for some time. In some other separate embodiments of the invention, upon receipt of successive values of the illuminance levels of the red, green, and blue components of the ambient natural illumination by the programmed controller 15 from the RGB-sensor 6, the preliminary received values may be taken into consideration, e.g., an average value (e.g., an arithmetic mean) of several previous "samples" of values from the RGB-sensor 6 may be used as input data for calculation of the required emission power levels of the light emitters of the plurality of light emitters 24 so as to provide smoother alteration of the spectrum of the light that is emitted by the illumination device 1 and so as to compensate for arbitrary correlations within the data about the illuminance levels of the red, green, and blue components of the ambient illumination that is received by the programmed controller 15 from the RGB-sensor 6.

However, in any case, the inventive structure enables to alter the emission power of separate or all light emitters of the plurality of light emitters 24 according to the spectrum of the ambient natural illumination (that may be changed in real time) during use of the portable hand-held illumination device 1 at a depth underwater during performing the photography or videography in the real time (i.e., periodically, in rather short time periods, e.g., in each 10 . . . 100 ms) and in the automatic mode so as to form the necessary illumination of the environment in a certain location at a certain depth.

Therefore, the operating portable hand-held illumination device 1 is configured to react quickly on alterations of the ambient illumination and to reproduce such an illumination that differs from the ambient illumination underwater in terms of the spectral characteristic; however, upon reflection from the objects under shooting, it is perceived by the photomatrix of the digital camera within different color channels with such illuminance levels that the ratio between them coincides or is maximum close to the ratio of the corresponding illuminance levels acquired by the photomatrix of the digital camera from the light of the ambient natural illumination underwater reflected from the same objects under shooting. Use of the portable hand-held illumination device 1 provides a possibility of achievement of the maximum close color rendering for the objects, which are located underwater at different distance from the portable hand-held illumination device during photography and/or videography.

In separate embodiments and use variants of the inventive structure, the plurality of light emitters 24 may comprise at least three multi-colored light emitters: red 3, green 4, and blue 5 (which reproduce the light of red, green, and blue color) or, e.g., the plurality of light emitters 24 may comprise at least three multi-colored light emitters: white 19, green 4, and blue 5 (which reproduce the light of white, green, and blue color respectively). Furthermore, in separate use variants of the inventive structure, four multi-colored light emitters may be mounted and applied: red 3, green 4, blue 5, and white 19, which reproduce the light of red, green, white, and white color. These above-mentioned examples of use of the multi-colored light emitters 3, 4, 5, 19 in the inventive structure (depending on a certain technological need) enable to use the device within various water bodies with various composition of the water (e.g., within fresh or saline ones) during various time of day and with various illuminance levels.

In other separate use variants of the inventive structure, the plurality of light emitters 24 may comprise three or four, or more, multi-colored groups of the light emitters. Such groups may be: the red group 20, the green group 21, the blue group 22, and the white group 23 of the light emitters, which reproduce the light of red, green, blue, and white color. Use of several multi-colored groups, which are formed by single-colored light emitters, in the inventive structure enables to enhance the illuminance of the illumination created underwater and to expand the range of use of the multi-colored components when creating illumination underwater, and it generally allows to perform a more effective photo and/or video fixation underwater, by means of the photo and video camera, of such images, which store the information about all colors of the visible range of the spectrum, which are essential for the perception by an average person.

The described operation of all the structural elements and pieces of the portable hand-held illumination device 1 enables to create such an illumination underwater that allows to perform the photo and/or video fixation underwater, by means of the photo and video camera, of such images, which store the information about all colors of the visible range of the spectrum, which are essential for the perception by an average person.

The inventive structure enables using at least one additional RGB-sensor 25 that is intended to acquire the information about the optical spectrum of the light that is emitted by the light emitters of the plurality of light emitters 24. The RGB-sensor 25, due to its own at least three illuminance level measurement sensors 26, 27, 28 and colored light filters (red 29, green 30, blue 31), is intended to acquire the information about the optical spectrum of the illumination that is reproduced by the at least three light emitters of the plurality of light emitters 24. That is, to acquire the information about the illuminance levels of the "red", "green", and "blue" components of the light that is emitted by the light emitters of the plurality of light emitters 24. The additional RGB-sensor 25 may operate both simultaneously with the main RGB-sensor 6 and separately and independently thereof.

The additional RGB-sensor 25 is coupled so as to form the single electronic digital system 18 to other elements of this system 18. By means of the additional RGB-sensor 25, the programmed controller 15 is enabled to control the spectrum of the combined "composite" light that is emitted by the light emitters of the plurality of light emitters 24 and to introduce corrections, if there are differences in the data received from the additional RGB-sensor 25 and the RGB-sensor 6. That is, in one of particular exemplary embodiments of the invention, when the additional RGB-sensor 25 is present, if the light emitters of the plurality of light emitters 24 emit the light that differs from the light of the ambient natural illumination in terms of the relative levels (as received by the RGB-sensor 6 and the additional RGB-sensor 25) of the red, green, and blue components, it will be possible to use, in the operation algorithm of the programmed controller 15, the data received from the additional RGB-sensor 25 in order to correct the emission power of the light emitters in such a way so that the light emitters of the plurality of light emitters 24 could emit such a light that would be identical (or minimally different) to the light from the ambient natural illumination in terms of the relative levels of the red, green, and blue components received by the RGB-sensor 6 and by the additional RGB-sensor 25. The presence and the operation of the additional RGB-sensor 25 comprised in the proposed illumination device 1 may variegate and enhance the achievement of the technical effect, namely, to additionally "guarantee" that the at least three light emitters 3, 4, 5 or 19, 4, 5 emit the light that has exactly such spectral characteristics, which are expected and which correspond to the posed task, in order to enable the effective reproduction of such an illumination that differs from the ambient illumination underwater in terms of the spectral characteristic, however, upon reflection from the objects under shooting, it is perceived by the photomatrix of the digital camera within different color channels with such illuminance levels that the ratio between them coincides or is maximum close to the ratio of the corresponding illuminance levels acquired by the photomatrix of the digital camera from the light of the ambient natural illumination underwater reflected from the same objects under shooting.

The inventive structure enables using the waterproof display 32 that is connected to the electronic digital system 18. This waterproof display 32 displays such parameters of operation and current status of the illumination device 1 as: a current charge status of the battery 16, an operation mode of the device (if several operation modes of the device are provided), a user menu (if programming of the device or change of the device operation modes by means of the menu is provided), current illuminance levels within each color channel, which are fixed by the RGB-sensor 6, and other necessary information.

Use of the waterproof display 32 enable the user (operator) to perform a continuous visual control of the operation and the current status of the operating portable hand-held illumination device 1 when they (user, operator) create the illumination underwater at moments of performing the underwater photography and/or videography. Thus, the presence of the display 32 within the proposed illumination device facilitates more effective achievement of the technical effect of the invention.

INDUSTRIAL APPLICABILITY

The proposed portable hand-held illumination device for underwater photography and/or videography has passed wide research during its industrial manufacturing, as well as during its use at different depths within different water bodies.

Results of the research have shown that the structure of the proposed invention allows creating the portable hand-held illumination device for the underwater photography and/or videography, which during its use, due to the set of all essential features, allows achieving the sought technical effect when performing the underwater photography and/or videography. Use of the portable hand-held illumination device 1 results in a possibility of achievement of the maximum close color rendering for the objects, which are located underwater at different distance from the portable hand-held illumination device during photography and/or videography.

The specific exemplary embodiment of the proposed invention, its use is mentioned above as the best exemplary embodiment.

The proposed portable hand-held illumination device for the underwater photography and/or videography meets all the requirements of its use, application, and commonly accepted safety rules regarding use of such devices underwater at different depths.

The invention claimed is:
1. An illumination device comprising:
a plurality of light emitters configured to illuminate an environmental area;
at least one spectrum measurement device configured to obtain information about an optical spectrum of an ambient illumination within said environmental area;
control means adapted to alter emissions of light emitters of the plurality of light emitters based on obtained information about the optical spectrum, wherein the illumination device is made as a portable hand-held illumination device for underwater photography and videography, the portable hand-held illumination device further comprising:
a waterproof, pressure-retaining housing;
at least one power element arranged inside the waterproof, pressure-retaining housing;
control elements for controlling operations of the portable, hand-held illumination device disposed within the waterproof, pressure-retaining housing;
the plurality of light emitters comprising at least three light emitters having different spectral characteristics of light emitted by the at least three light emitters;
a waterproof, transparent pressure-retaining material configured to enable light beams to go through the waterproof, transparent pressure-retaining material, the light beams generated from the light emitters of the plurality of light emitters, the waterproof, transparent pressure-retaining material coupled to the waterproof, pressure-retaining housing;
an operating platform of the portable, hand-held illumination device from which light is emitted and which is enclosed by the waterproof, transparent pressure-retaining material;
at least one spectrum measurement RGB-sensor formed from at least three illuminance level measurement sensors, the illuminance level measurement sensors configured to obtain information about the optical spectrum of the ambient illumination within the environmental area of the portable hand-held illumination device underwater;
a programmed controller that is arranged inside the waterproof, pressure-retaining housing, wherein the light emitters of the plurality of the light emitters, the at least one RGB-sensor, the programmed controller, the power element, and the control elements for controlling the operation of the portable, hand-held illumination device are combined into an electronic digital system, wherein the programmed controller is adapted to alter the emissions of the light emitters of the plurality of light emitters in a quantity of at least three light emitters, and the programmed controller configured to receive information from the at least one RGB-sensor, to process this information according to a preset program algorithm and, according to results obtained from the at least one RGB-sensor, to transmit control signals to the electronic digital system that, in turn, is adapted to alter emission power levels of the light emitters of the plurality of light emitters, wherein each of the illuminance level measurement sensors of the at least one RGB-sensor comprises a separate colored light filter, a first illuminance level measurement sensor comprising a red colored light filter, a second illuminance level measurement sensor comprising a green colored light filter, and a third illuminance level measurement sensor comprising a blue colored light filter;
the at least one RGB-sensor disposed within the portable hand-held illumination device so an at least three illuminance level measurement sensors, together with corresponding red, green, and blue light filters are configured to perceive light from the ambient illumination and transmit the illuminance levels of red, green, and blue components of light that has passed through the corresponding red, green, and blue colored light filters of the at least one RGB-sensor to the programmed controller for further altering the emission power levels of the light emitters of the plurality of light emitters, and, at the same time, the at least one RGB-sensor disposed within the portable hand-held illumination device so the at least three illuminance level measurement sensors, together with the corresponding colored light filters, do not perceive light from illumination that is created by the light emitters of the plurality of light emitters at points in time, when information about the illuminance level of the red, green, and blue components of light that has passed through the corresponding red, green, and blue colored light filters of the at least one RGB-sensor is received by the programmed controller for further processing and determining an operation mode of the light emitters of the plurality of light emitters as a result of this processing, wherein the at least three light emitters of the plurality of light emitters are located at a plane of the operating platform of the portable hand-held illumination device under the waterproof, transparent pressure-retaining material disposed inside the waterproof, pressure-retaining housing; and each separate light emitter or each separate group of light emitters of the plurality of light emitters configured to be controlled by the programmed controller to control an emission intensity level of the light emitted by them from 0 to 100% regardless of the emission intensity level of other light emitters and other groups of light emitters of the plurality of light emitters, wherein the at least three light emitters of the plurality of light emitters are configured to emit light of spectral characteristics that enable reproducing with an accuracy preset in the preset program algorithm of the programmed controller, any color within a RGB color space that corresponds to the color that is fixed by the at least one RGB-sensor within the ambient illumination spectrum in the environmental area of the portable hand-held illumination device underwater.

2. The illumination device of claim 1, wherein the plurality of light emitters in the quantity of the at least three light emitters comprises three multi-colored light emitters, wherein a first light emitter is configured to emit a white color light and is a white light emitter, a second light emitter is configured to emit a green color light and is a green light emitter, and a third light emitter is configured to emit a blue color light and is a blue light emitter.

3. The illumination device of claim 1, wherein the plurality of light emitters in the quantity of the at least three light emitters comprises three multi-colored groups of the light emitters of the plurality of light emitters, wherein a first group of the light emitters of the plurality of light emitters is configured to emit a white color light and is a white group of the light emitters of the plurality of light emitters that is formed by the white light emitters, a second group of the light emitters of the plurality of light emitters is configured to emit a green color light and is a green group of the light emitters that is formed by the green light emitters, and a third group of the light emitters of the plurality of light emitters is configured to emit a blue color light and is a blue group of the light emitters that is formed by the blue light emitters.

4. The illumination device according to claim 1, wherein the plurality of light emitters in the quantity of the at least three light emitters comprises four multi-colored light emitters, wherein the first light emitter is configured to emit a red color light and is the red light emitter, the second light emitter is configured to emit a green color light and is the green light emitter, the third light emitter is configured to emit a blue color light and is the blue light emitter, and a fourth light emitter is configured to emit a white color light and is a white light emitter.

5. The illumination device of claim 1, wherein the plurality of light emitters of the plurality of light emitters in the quantity of the at least three light emitters comprises four multi-colored groups of the light emitters of the plurality of light emitters, wherein the first group of the light emitters of the plurality of light emitters is configured to emit a red color light and is a red group of the light emitters of the plurality of light emitters that is formed by the red light emitters, the second group of the light emitters of the plurality of light emitters is configured to emit a green color light and is the green group of the light emitters of the plurality of light emitters that is formed by the green light emitters, a third group of the light emitters of the plurality of light emitters is configured to emit a blue color light and is the blue group of the light emitters that is formed by the blue light emitters, and the fourth group of the light emitters of the plurality of light emitters is configured to emit a white color light and is the white group of the light emitters of the plurality of light emitters that is formed by the white light emitters.

6. The illumination device of claim 1, wherein the illumination device further comprises a waterproof display that is connected to the electronic digital system.

* * * * *